United States Patent
Yamagishi et al.

(10) Patent No.: US 10,469,552 B2
(45) Date of Patent: Nov. 5, 2019

(54) RECEPTION APPARATUS, RECEPTION METHOD, TRANSMISSION APPARATUS, AND TRANSMISSION METHOD

(71) Applicant: Sony Corporation, Tokyo (JP)

(72) Inventors: Yasuaki Yamagishi, Kanagawa (JP); Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 355 days.

(21) Appl. No.: 15/122,536

(22) PCT Filed: Mar. 27, 2015

(86) PCT No.: PCT/JP2015/001797
§ 371 (c)(1),
(2) Date: Aug. 30, 2016

(87) PCT Pub. No.: WO2015/151487
PCT Pub. Date: Oct. 8, 2015

(65) Prior Publication Data
US 2017/0070552 A1    Mar. 9, 2017

(30) Foreign Application Priority Data
Apr. 4, 2014 (JP) ................... 2014-078033

(51) Int. Cl.
*G06F 15/16* (2006.01)
*H04L 29/06* (2006.01)
(Continued)

(52) U.S. Cl.
CPC .......... *H04L 65/4092* (2013.01); *H04L 67/02* (2013.01); *H04L 67/42* (2013.01);
(Continued)

(58) Field of Classification Search
CPC ..... H04L 65/4092; H04L 67/02; H04L 67/42; H04L 29/06
See application file for complete search history.

(56) References Cited

U.S. PATENT DOCUMENTS

2003/0101230 A1* 5/2003 Benschoter ....... G06F 17/30029
709/217
2005/0240530 A1* 10/2005 Watanabe ............. G06Q 30/06
705/52

(Continued)

OTHER PUBLICATIONS

Office Action dated May 16, 2018 in European Patent Application No. 15716594.5, 7 pages.
(Continued)

*Primary Examiner* — Razu A Miah
(74) *Attorney, Agent, or Firm* — Xsensus, LLP

(57) ABSTRACT

A reception apparatus includes circuitry configured to receive a digital broadcast signal. Based on a media presentation description (MPD), which conforms to the moving picture expert group-dynamic adaptive streaming over HTTP (MPEG-DASH) standard and is transmitted in the digital broadcast signal or via a communication network, the circuitry performs at least one of selection or grouping of components according to a level of a component hierarchy associated with the components, and controls playback of content of at least one of the components.

9 Claims, 29 Drawing Sheets

(51) Int. Cl.
*H04N 21/2343* (2011.01)
*H04N 21/262* (2011.01)
*H04N 21/458* (2011.01)
*H04N 21/472* (2011.01)
*H04N 21/845* (2011.01)
*H04N 21/8543* (2011.01)
*H04L 29/08* (2006.01)
*H04N 21/61* (2011.01)
*H04N 21/643* (2011.01)

(52) U.S. Cl.
CPC . *H04N 21/23439* (2013.01); *H04N 21/26258* (2013.01); *H04N 21/458* (2013.01); *H04N 21/472* (2013.01); *H04N 21/8456* (2013.01); *H04N 21/8543* (2013.01); *H04N 21/6112* (2013.01); *H04N 21/64322* (2013.01)

(56) References Cited

U.S. PATENT DOCUMENTS

| | | | |
|---|---|---|---|
| 2006/0263048 A1* | 11/2006 | Sato | H04N 5/775 386/247 |
| 2006/0265654 A1* | 11/2006 | Nakamura | G06F 1/1626 715/704 |
| 2010/0086285 A1* | 4/2010 | Sasaki | G11B 27/105 386/212 |
| 2011/0119394 A1* | 5/2011 | Wang | H04N 21/23439 709/231 |
| 2012/0185693 A1* | 7/2012 | Chen | H04N 21/41407 713/168 |
| 2012/0226783 A1* | 9/2012 | Murata | G06F 17/30743 709/219 |
| 2012/0233345 A1* | 9/2012 | Hannuksela | H04N 21/26258 709/231 |
| 2013/0124749 A1* | 5/2013 | Thang | H04L 65/4092 709/231 |
| 2013/0159546 A1* | 6/2013 | Thang | H04L 65/4084 709/231 |
| 2014/0006564 A1* | 1/2014 | Thang | H04L 65/601 709/219 |
| 2014/0089467 A1* | 3/2014 | Beck | H04L 67/02 709/219 |
| 2014/0189139 A1* | 7/2014 | Cheng | H04L 65/60 709/231 |
| 2014/0189772 A1* | 7/2014 | Yamagishi | H04N 21/2225 725/116 |
| 2014/0195651 A1* | 7/2014 | Stockhammer | H04N 21/23439 709/219 |
| 2014/0317308 A1* | 10/2014 | Zhang | H04L 65/4069 709/231 |
| 2015/0026748 A1* | 1/2015 | Mantin | H04N 21/6581 725/116 |
| 2015/0195589 A1* | 7/2015 | Jones | H04N 21/23439 725/126 |
| 2015/0365458 A1* | 12/2015 | Yamagishi | H04N 21/26616 709/219 |
| 2015/0373383 A1* | 12/2015 | Pichumani | H04N 21/234381 725/90 |
| 2016/0006817 A1* | 1/2016 | Mitic | H04L 65/4076 709/232 |

OTHER PUBLICATIONS

DVB Organization: "23009-1-FDIS-clean.doc", DVB, Digital Video Broadcasting, Nov. 22, 2013, XP017842286, 150 pages.
Chinese Office Action, dated Nov. 30, 2018, issued in Chinese Patent Application No. 2015800165295, 14 pages.
International Standard, "Information technology-Dynamic adaptive streaming over HTTP (DASH)—Part 1: Media presentation description and segment formats", Reference No. ISO/IEC FDIS 23009-1:2013(E), 152 pages.

* cited by examiner

FIG. 2

```
<MPD>
    <Period>
        <AdaptationSet>
            <Representation>
                <SubRepresentation>
                    :
                </SubRepresentation>
                <SubRepresentation>
                    :
                </SubRepresentation>
            </Representation>
            <Representation>
                :
            </Representation>
        </AdaptationSet>
        <AdaptationSet>
            :
        </AdaptationSet>
    </Period>
    <Period>
        :
    </Period>
</MPD>
```

FIG. 9

```
<MPD>
 <Period>
  <AdaptationSet id='1' >...</AdaptationSet>
  <AdaptationSet id='12' >...</AdaptationSet>
  <AdaptationSet id='65' >...</AdaptationSet>
  <AdaptationSet id='74' >...</AdaptationSet>
  <AdaptationSet id='385' >...</AdaptationSet>
  <Subset @contains=' 1 65' />
  <Subset @contains=' 12 74 385' />
 </Period>
</MPD>
```

1 AND 65 ARE SET OF AdaptationSet PLAYED AT THE SAME TIME

FIG. 11

```
<MPD>
  <Period>
    <AdaptationSet id='1'   group='1' >...</AdaptationSet>
    <AdaptationSet id='12'  group='2' >...</AdaptationSet>
    <AdaptationSet id='65'  group='1' >...</AdaptationSet>  } ONLY ONE OF THOSE
    <AdaptationSet id='74'  group='2' >...</AdaptationSet>  } HAVING THE SAME group
    <AdaptationSet id='385' group='2' >...</AdaptationSet>  } ATTRIBUTE VALUE IS PLAYED.
  </Period>
</MPD>
```

FIG. 13

```
<MPD>
  <Period>
    <AdaptationSet id='1'  >...</AdaptationSet>
    <AdaptationSet id='10' >...</AdaptationSet>
    <AdaptationSet id='12' >...</AdaptationSet>
    <AdaptationSet id='65' >...</AdaptationSet>
    <AdaptationSet id='74' >...</AdaptationSet>
    <AdaptationSet id='385' >...</AdaptationSet>
    <Subset @contains='1 10' @group='1' />
    <Subset @contains='12 74' @group='2' />
    <Subset @contains='65 385' @group='2' />
  </Period>
</MPD>
```

PAIR OF 12 AND 74 OR PAIR OF 65 AND 385 WHICH ARE RESPECTIVE PAIRS OF TWO DIFFERENT Subsets HAVING THE SAME group ATTRIBUTE VALUE IS PLAYED.

FIG. 18

```
<MPD>
  <Period>
  ...
    <AdaptationSet @id=1 ...> -- CORRESPONDING TO AUDIO COMPONENT TO BE mixed AND PLAYED
      <EssentialProperty @schemeIdUri=urn:ATSC:mixingGroup @value=" 23, 0.37" >
    </AdaptationSet>
    <AdaptationSet @id=2 ...> -- CORRESPONDING TO AUDIO COMPONENT TO BE mixed AND PLAYED
      <EssentialProperty @schemeIdUri=urn:ATSC:mixingGroup @value=" 23, 0.25" >
    </AdaptationSet>
  ...
  </Period>
</MPD>
```

FIG. 20

```
<MPD>
  <Period>
    <AdaptationSet id='1'   group='1' >...</AdaptationSet>
    <AdaptationSet id='12'  group='2' >...</AdaptationSet>  ⎫ ONLY ONE OF THOSE
    <AdaptationSet id='65'  group='1' >...</AdaptationSet>  ⎬ HAVING THE SAME group
    <AdaptationSet id='74'  group='2' >...</AdaptationSet>  ⎭ ATTRIBUTE VALUE IS PLAYED.
    <AdaptationSet id='385' group='2' >...</AdaptationSet>
  </Period>
</MPD>
```

RECEPTION APPARATUS, RECEPTION METHOD, TRANSMISSION APPARATUS, AND TRANSMISSION METHOD

TECHNICAL FIELD

The present disclosure relates to a reception apparatus, a reception method, a transmission apparatus, and a transmission method, and particularly relates to a reception apparatus, a reception method, a transmission apparatus, and a transmission method which are able to provide a broadcast service by using an MPEG-DASH method.

CROSS REFERENCE TO RELATED APPLICATIONS

This application claims the benefit of Japanese Priority Patent Application JP 2014-078033 filed Apr. 4, 2014, the entire contents of which are incorporated herein by reference.

BACKGROUND ART

The standardization of a method applied to video on demand (VoD) streaming by hypertext transfer protocol (HTTP) streaming and live streaming as a flow of standardization in Internet streaming such as internet protocol television (IPTV). Particularly, moving picture expert Group-dynamic adaptive streaming over HTTP (MPEG-DASH) in which standardization is performed in ISO/IEC/MPEG has attracted attention (for example, see NPL 1).

In MPEG-DASH, streaming data is obtained and played according to a meta file referred to as media presentation description (MPD) and an address (URL: Uniform Resource Locator) of media data such as audio, videos, or subtitles which are chunked and described in the meta file.

A plurality of candidates having different attributes are listed in the stream of media data (Representation) described in the MPD. An application that processes the MPD (for example, a stream player, and the like) selects the best stream in accordance with the current network environmental conditions from the streams of the plurality of candidates, and obtains and plays the stream.

Then, if the network environment changes, a stream to be acquired changes depending on the network environment. Further, the reference of selection is assumed as selection by an end user (viewer), a capability attribute of a device (for example, an implemented function), a method attribute (for example, codecs, and the like), and a capability attribute (for example, a memory capability, a processing capability, or the like).

CITATION LIST

Non Patent Literature

NPL 1: ISO/IEC 23009-1:2012 Information technology Dynamic adaptive streaming over HTTP (DASH)

SUMMARY OF INVENTION

Technical Problem

It has been considered to provide a broadcast service using the MPEG-DASH method, but a technology method for providing such a broadcast service has not been established.

The present technology has been made in view of such circumstances, and it is possible to provide a broadcast service using the MPEG-DASH method.

Solution to Problem

A reception apparatus according to a first embodiment of the present technology is a reception apparatus including circuitry configured to receive a digital broadcast signal. Based on a media presentation description (MPD), which conforms to the moving picture expert group-dynamic adaptive streaming over HTTP (MPEG-DASH) standard and is transmitted in the digital broadcast signal or via a communication network, the circuitry performs at least one of selection or grouping of components according to a level of a component hierarchy associated with the components, and controls playback of content of at least one of the components.

A reception method according to the first embodiment of the present technology is a reception method corresponding to the reception apparatus of the first embodiment of the present technology.

In the reception apparatus and the reception method according to the first embodiment of the present technology, a digital broadcast signal is received. Based on a media presentation description (MPD), which conforms to the moving picture expert group-dynamic adaptive streaming over HTTP (MPEG-DASH) standard and is transmitted in the digital broadcast signal or via a communication network, at least one of selection or grouping of components according to a level of a component hierarchy associated with the components is performed, and playback of content of at least one of the components is controlled.

A transmission apparatus according to a second embodiment of the present technology is a transmission apparatus including circuitry configured to generate a media presentation description (MPD) that conforms to the moving picture expert group-dynamic adaptive streaming over HTTP (MPEG-DASH) standard. The MPD includes information for performing at least one of selection or grouping of components according to a level of a component hierarchy associated with the components and controlling playback of content of at least one of the components. The circuitry is further configured to transmit the generated MPD in a digital broadcast signal or via a communication network.

A transmission method according to the second embodiment of the present technology is a transmission method corresponding to the transmission apparatus of the second embodiment of the present technology.

In the transmission apparatus and the transmission method according to the second embodiment of the present technology, a media presentation description (MPD), which conforms to the moving picture expert group-dynamic adaptive streaming over HTTP (MPEG-DASH) standard, is generated. The MPD includes information for performing at least one of selection or grouping of components according to a level of a component hierarchy associated with the components and controlling playback of content of at least one of the components. Further, the generated MPD is transmitted in a digital broadcast signal or via a communication network.

A reception apparatus according to a third embodiment of the present technology is a reception apparatus including circuitry configured to receive a digital broadcast signal. Based on a media presentation description (MPD), which conforms to the moving picture expert group-dynamic adaptive streaming over HTTP (MPEG-DASH) standard and is transmitted in the digital broadcast signal or via a communication network, the circuitry performs at least one of selection or grouping of components according to a level of a component hierarchy associated with the components, and controls playback of content of at least one of the components. The MPD includes a first element for designating a pair of AdaptationSet elements, in a range outside of the component hierarchy.

A reception method of the third embodiment of the present technology is a reception method corresponding to the reception apparatus of the third embodiment of the present technology.

In the reception apparatus and the reception method according to the third embodiment of the present technology, a digital broadcast signal is received. Based on a media presentation description (MPD), which conforms to the moving picture expert group-dynamic adaptive streaming over HTTP (MPEG-DASH) standard and is transmitted in the digital broadcast signal or via a communication network, at least one of selection or grouping of components according to a level of a component hierarchy associated with the components is performed, and playback of content of at least one of the components is controlled. In addition, the MPD includes a first element for designating a pair of AdaptationSet elements, in a range outside of the component hierarchy.

A transmission apparatus according to a fourth embodiment of the present technology is a transmission apparatus including circuitry configured to generate a media presentation description (MPD) that conforms to the moving picture expert group-dynamic adaptive streaming over HTTP (MPEG-DASH) standard. The MPD includes information for performing at least one of selection or grouping of components according to a level of a component hierarchy associated with the components and controlling playback of content of at least one of the components. The MPD further includes a first element for designating a pair of AdaptationSet elements, in a range outside of the component hierarchy. The circuitry is further configured to transmit the generated MPD in a digital broadcast signal or via a communication network.

A transmission method according to the fourth embodiment of the present technology is a transmission method corresponding to the transmission apparatus of the fourth embodiment of the present technology.

In the transmission apparatus and the transmission method according to the fourth embodiment of the present technology, a media presentation description (MPD), which conforms to the moving picture expert group-dynamic adaptive streaming over HTTP (MPEG-DASH) standard, is generated. The MPD includes information for performing at least one of selection or grouping of components according to a level of a component hierarchy associated with the components and controlling playback of content of at least one of the components. The MPD further includes a first element for designating a pair of AdaptationSet elements, in a range outside of the component hierarchy. Further, the generated MPD is transmitted in a digital broadcast signal or via a communication network.

Advantageous Effects of Invention

According to the first to fourth embodiments of the present technology, it is possible to provide a broadcast service by using the MPEG-DASH method.

In addition, the effects described herein are not necessarily limited, and may be any of the effects described in this disclosure.

BRIEF DESCRIPTION OF DRAWINGS

FIG. 2 is a diagram illustrating a description example of the MPD.

FIG. 9 is a diagram illustrating a description example of the Subset element and a contains-attribute.

FIG. 11 is a diagram illustrating a description example of a group attribute of the AdaptationSet element.

FIG. 13 is a diagram illustrating a description example in which a group attribute is added in the Subset element.

FIG. 18 is a diagram illustrating a description example of the EssentialProperty element and the attribute thereof.

FIG. 20 is a diagram illustrating a description example of the group attribute of the AdaptationSet element.

DESCRIPTION OF EMBODIMENTS

Figure 1:
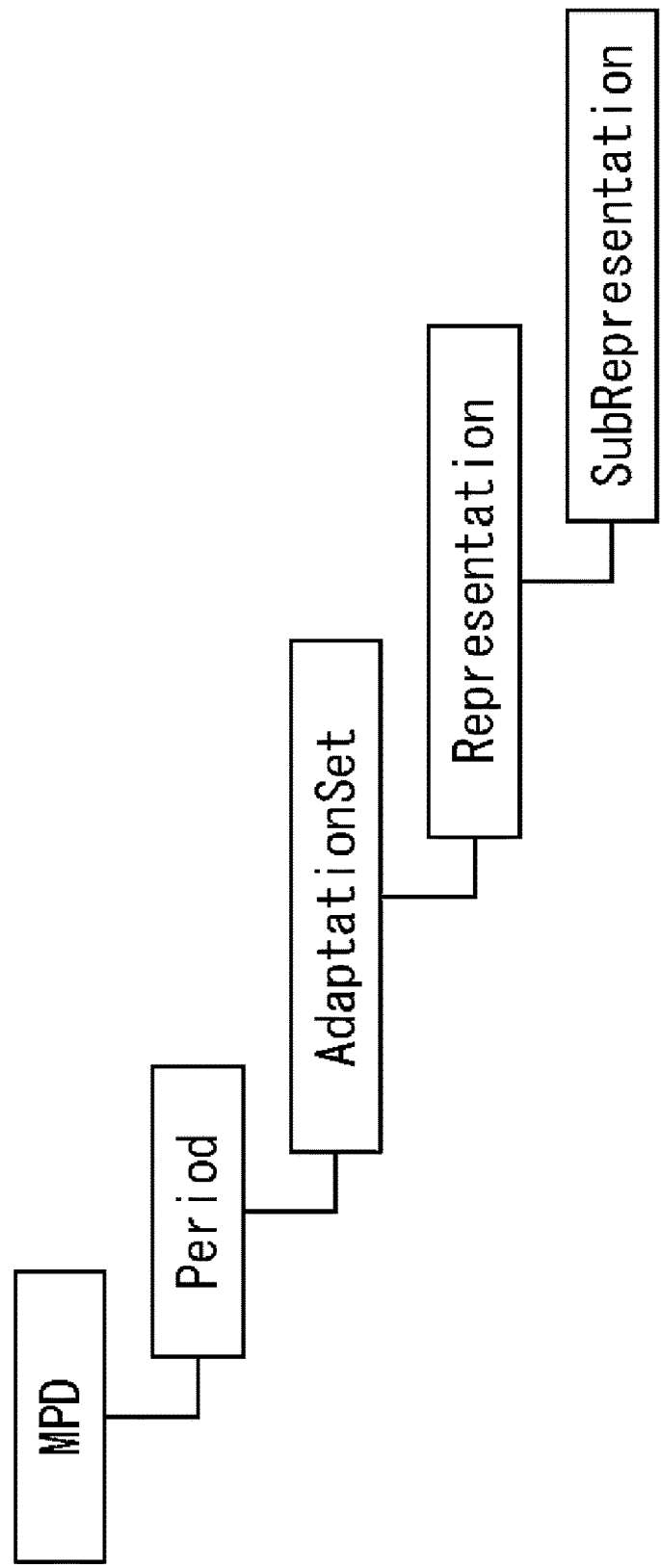
FIG. 1 is a diagram illustrating a structure of an MPD.

Hereinafter, embodiments of the present technology will be described with reference to the drawings. In addition, a description will be made in the following order.
1. Structure of MPD
2. Structure of component layer
3. First Embodiment
(1) Implementation method of function of layer of each level
(1-1) Function of layer of the level 3
(1-2) Function of layer of the level 2
(1-3) Function of layer of the level 1
(2) Specific operation example
(2-1) Operation example 1: mixing playback of audio
(2-2) Operation example 2: group selection of audio
(2-3) Operation example 3: playback of video and audio
4. Second Embodiment
(1) Implementation method of function of layer of each level
(1-1) Function of layer of the level 3
(1-2) Function of layer of the level 2
(1-3) Function of layer of the level 1
(2) Specific operation example
(2-1) Operation example 4: mixing playback of audio
(2-2) Operation example 5: group selection of audio
5. Third Embodiment
(1) Example of other use of Subset element
(2) Operation example 6: Grouping for simultaneous presentation of component
6. System configuration
7. Flow of specific process of each apparatus
8. Configuration of computer

1. Structure of MPD

<Structure of MPD>

FIG. 1 is a diagram illustrating a structure of a media presentation description (MPD). In addition, an MPD file is described as a hierarchical structure by a markup language such as, for example, an extensible markup language (XML), as illustrated in a description example of FIG. 2.

Here, as illustrated in FIG. 1, in the MPD, a Period element, an AdaptationSet element, a Representation element, and a SubRepresentation element are described as a hierarchical structure. The Period element is a unit that describes the configuration of content such as a program. Further, the AdaptationSet element, the Representation element, or the SubRepresentation element are used for each stream such as a video, audio, and subtitles so as to be able to describe the attribute of each stream.

Specifically, the AdaptationSet element represents streams which are encoded from various sources. Then, streams which are a plurality of choices having different parameters such as, for example, bit rates are listed, by placing the Representation element in the AdaptationSet element, in order to select the stream on a receiver side according to a parametric such as a bit rate. Generally, the AdaptationSet element and the Representation element correspond to a single stream such as a stream of a video, audio, or subtitles.

Figure 3:
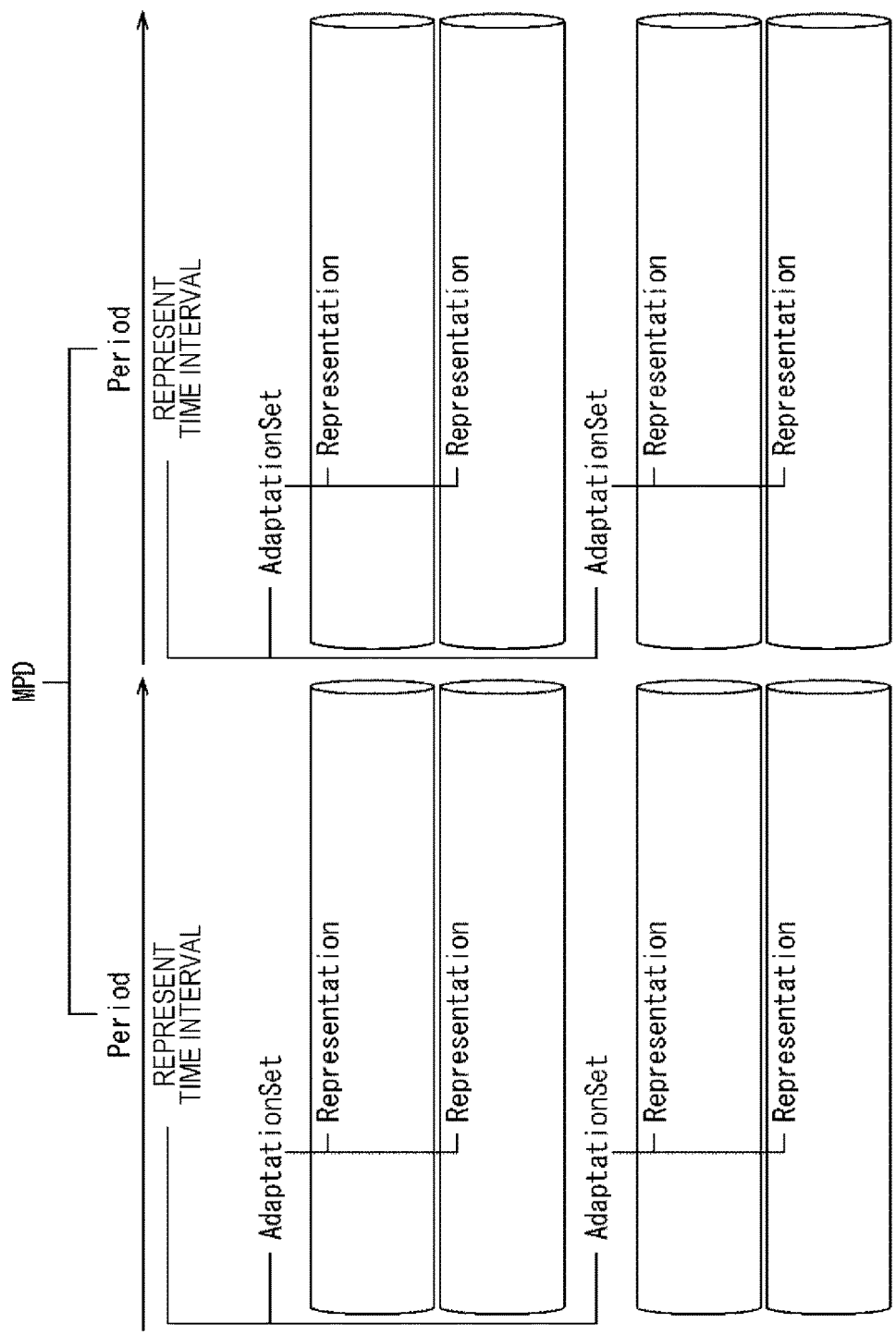
FIG. 3 is a diagram illustrating a relationship between an AdaptationSet element and a Representation element, in a case of representing a multiplexed stream.

Further, when the AdaptationSet element represents a stream in which a plurality of streams such as a video stream, an audio stream, and a subtitle stream are multiplexed, the multiplexed streams which are a plurality of choices having different parameters such as, for example, bit rates are listed, by placing the Representation element in the AdaptationSet element. In other words, as illustrated in FIG. 3, a plurality of AdaptationSet elements representing the multiplexed streams are disposed for each Period element representing a time interval, and a plurality of the multiplexed streams having, for example, different bit rates can be listed, by a plurality of Representation elements placed in the AdaptationSet elements.

Figure 4:
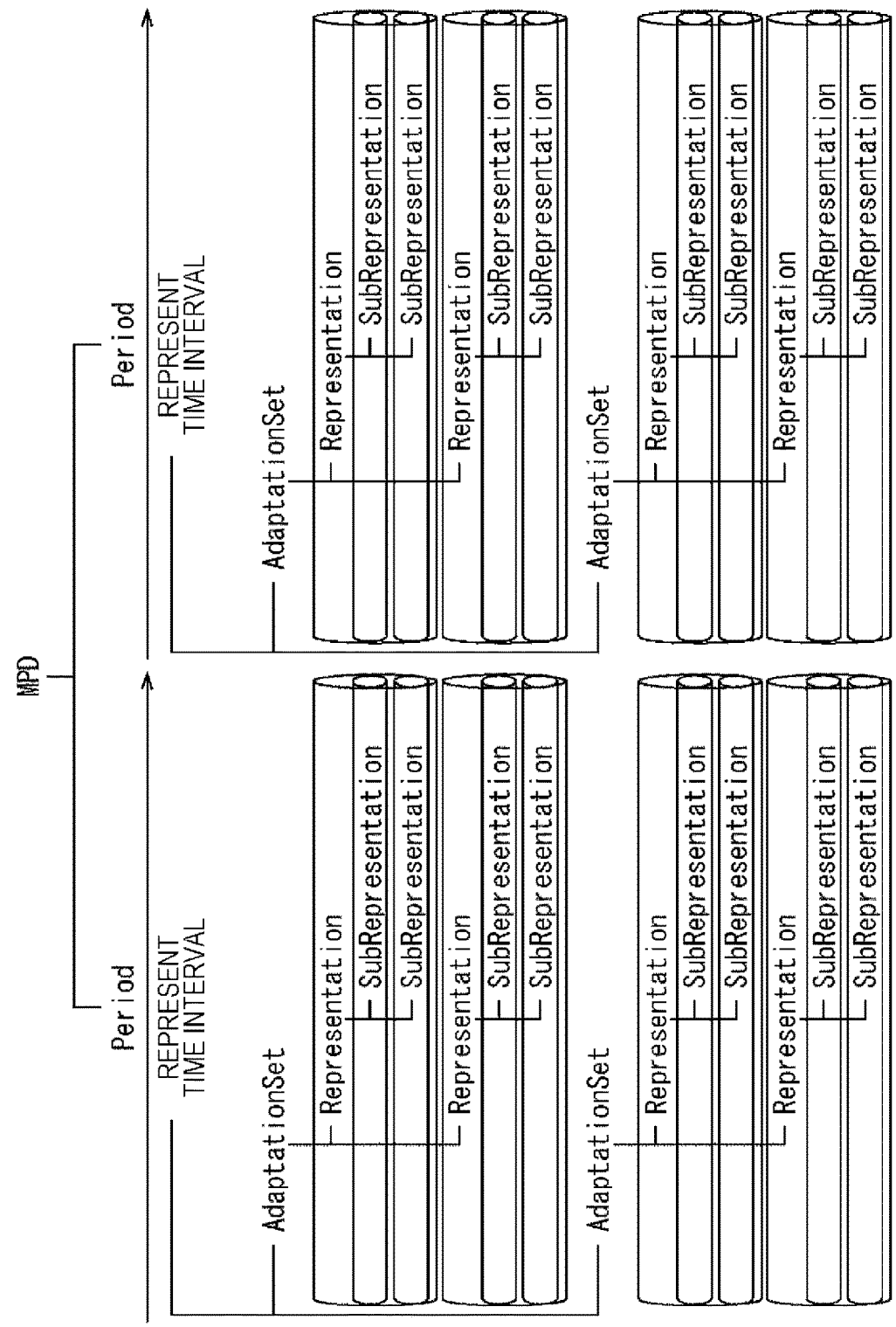
FIG. 4 is a diagram illustrating a relationship between the AdaptationSet element, the Representation element, and a SubRepresentation element, in a case of representing a multiplexed stream.

Further, in this case, it is possible to describe the attribute of the stream of each component constituting the multiplexed stream, by further placing the SubRepresentation element under the Representation element. In other words, as illustrated in FIG. 4, a plurality of AdaptationSet elements representing the multiplexed streams are disposed for each Period element representing a time interval, a plurality of Representation elements representing a multiplexed stream having, for example, different bit rates are placed in the AdaptationSet elements, and it is possible to describe the attributes of, for example, a video stream, an audio stream, and a subtitle stream, by the SubRepresentation element disposed in the Representation elements.

Figure 5:
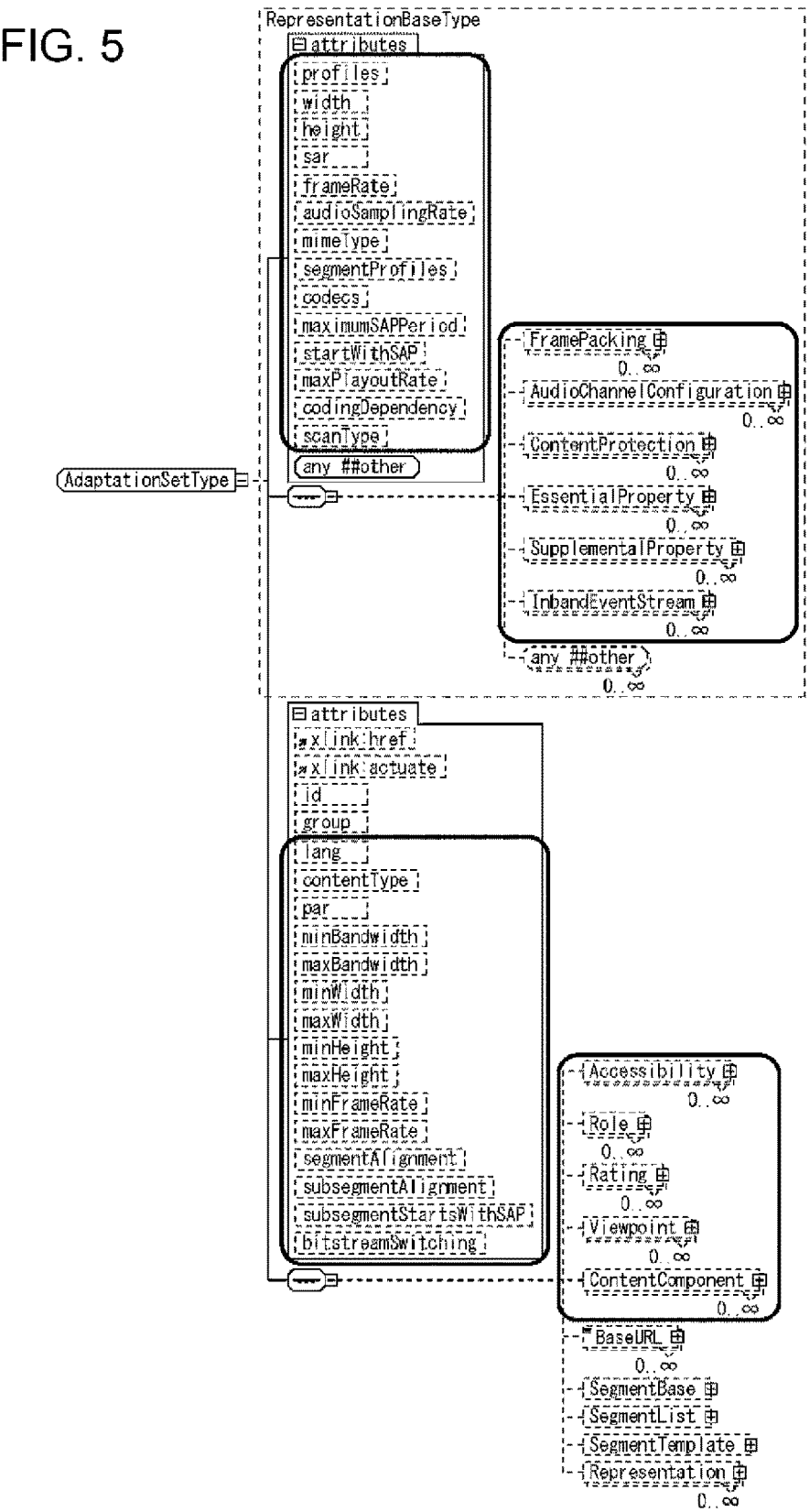
FIG. 5 is a diagram illustrating an example of attributes and elements that can be included in the AdaptationSet element.
Figure 6:
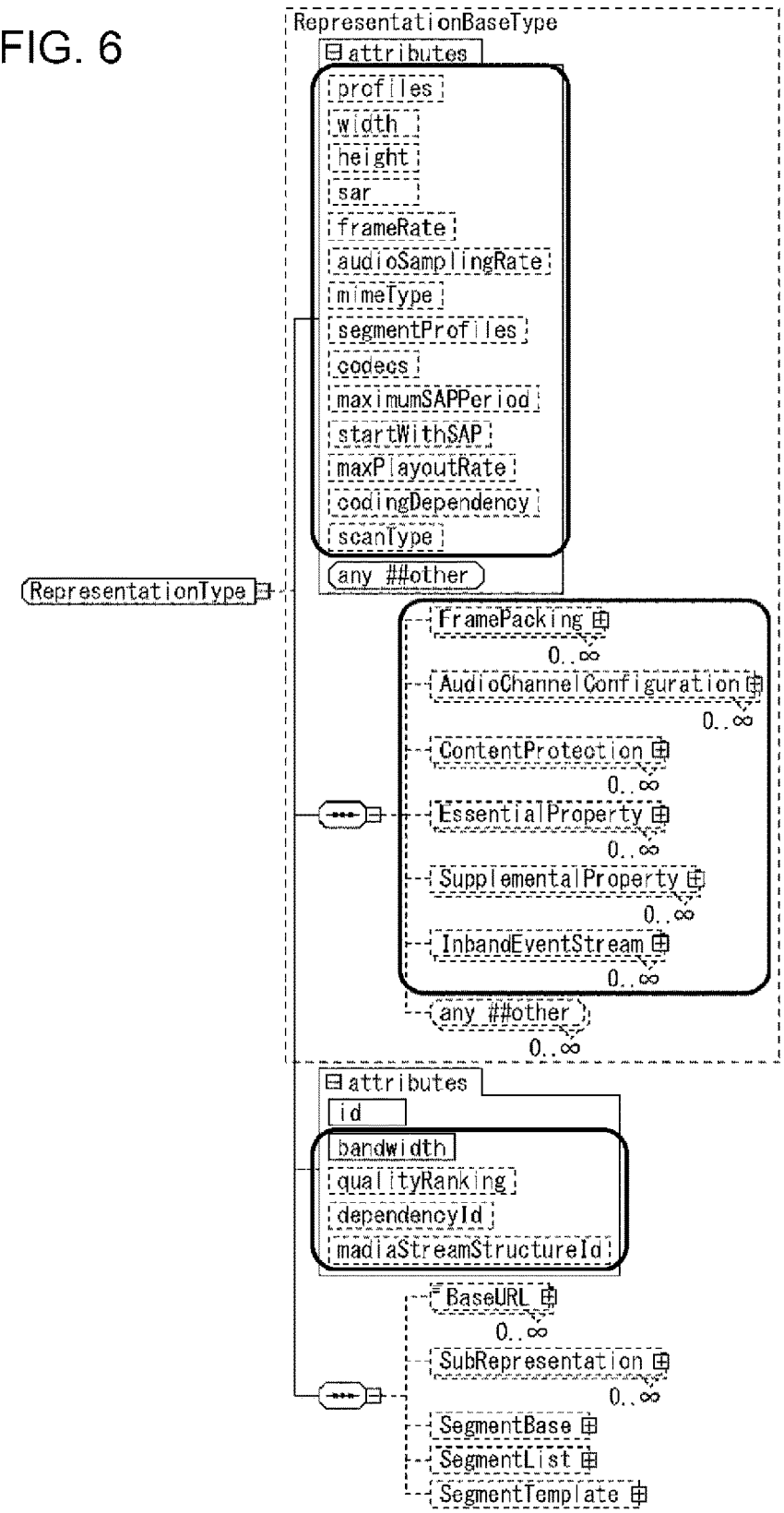
FIG. 6 is a diagram illustrating an example of attributes and elements that can be included in the Representation element.

In addition, the AdaptationSet element corresponds to a stream in which a plurality of streams are multiplexed, in addition to a single stream such as a video stream or an audio stream. In the standard of an MPEG-DASH, the attributes and the elements of FIG. 5 have already been defined, as the attributes and the elements that can be included in such an AdaptationSet element. Further, in the Representation element, streams which are a plurality of choices having different parameters such as, for example, bit rates are listed, in a range of the AdaptationSet element which is the higher element (parent element). In the standard of the MPEG-DASH, the attributes and the elements of FIG. 6 have already been defined, as the attributes and the elements that can be included in such a Representation element.

2. Structure of Component Layer

However, there is a requirement of the selection and structuring of a component, as a requirement for the broadcast service. Here, the selection of a component refers to selection of a best component, depending on various conditions such as a capacity of a codec corresponding to a receiver and a network environment. Further, the structuring of the stream component refers to combining and simultaneously displaying a plurality of stream components. In order to satisfy such a requirement for the selection and structuring of the components, as illustrated in FIG. 7, the components are expressed by a plurality of layer structures.

Figure 7:
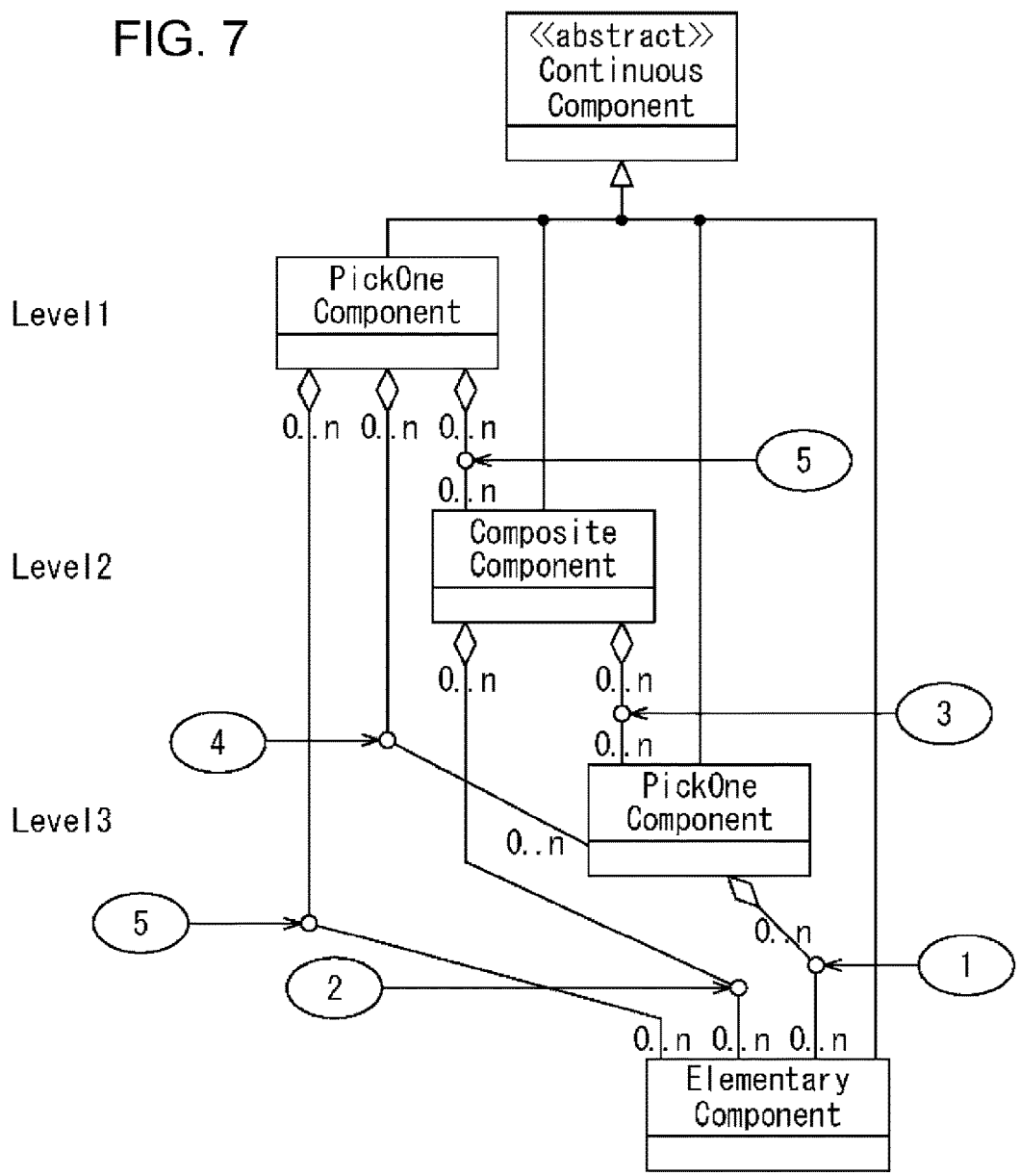
FIG. 7 is a diagram illustrating a component layer structure.

In FIG. 7, a component layer is configured with three layers of a layer of the level 1, a layer of the level 2, and a layer of the level 3. Further, in FIG. 7, an ElementaryComponent represents the component of a video, audio, or subtitles, as it is.

The layer of the level 3 corresponds to "Level 3" in FIG. 7, and is a layer for selecting one component among n (n is an integer of 0 or more) ElementaryComponents. Accordingly, the layer of the level 3 is referred to as a layer of PickOneComponent.

In FIG. 7, the relationship between the ElementaryComponent and the PickOneComponent is represented as "1". In addition, the layer of the level 3 may be referred to as an Adaptive Layer.

The layer of the level 2 corresponds to "Level 2" in FIG. 7, and is a layer for grouping (structuring) in order to combine and simultaneously display n (n is an integer of 0 or more) components that are selected in the layer of a level 3 or n (n is an integer of 0 or more) ElementaryComponents. The plurality of components which are grouped are regarded as one component. Accordingly, the layer of the level 2 is referred to as a layer of a CompositeComponent.

In FIG. 7, the relationship between the ElementaryComponent and the CompositeComponent is represented as "2". Further, the relationship between the PickOneComponent of the level 3 and the CompositeComponent is represented as "3". In addition, the layer of the level 2 may be referred to as a Composite Layer.

The layer of the level 1 corresponds to "Level 1" in FIG. 7, and is a layer for selecting one component among n (n is an integer of 0 or more) components that are grouped in the layer of the level 2 and n (n is an integer of 0 or more) components that are selected in the layer of the level 3 or n (n is an integer of 0 or more) ElementaryComponents. Accordingly, the layer of the level 1 is referred to as a layer of PickOneComponent.

In FIG. 7, the relationship between the PickOneComponent of the level 3 and the PickOneComponent of the level 1 is represented as "4". Further, the relationship between the ElementaryComponent and the PickOneComponent of the level 1 is represented as "5". Further, the relationship between the CompositeComponent and the PickOneComponent of the level 1 is represented as "5". In addition, the layer of the level 1 may be referred to as a Selective Layer.

As described above, since components are represented as a plurality of layer structures, for example, the requirement for the selection of the component is satisfied by the layer of the level 1 and the layer of the level 3, and the requirement for the structuring of the component is satisfied by the layer of the level 2. Hereinafter, in a case of providing a broadcast service by using the MPEG-DASH method, three embodiments will be described for a specific method for realizing a component layer structure of FIG. 7.

3. First Embodiment

(1) Implementation Method of Function of Layer of Each Level

In a first embodiment, in a case of providing a broadcast service by using the MPEG-DASH method, it is possible to use elements which have already been defined in the standard specification of MPD, in order to satisfy the service requirement of the component layer structure of FIG. 7. Hereinafter, an implementation method of a function of a layer of each level of the first embodiment will be described.

(1-1) Function of Layer of the Level 3

The function of the layer of the level 3 of FIG. 7 can be implemented by mapping the PickOneComponent to the AdaptationSet element of MPD and mapping Representation elements or SubRepresentation elements which are listed in the AdaptationSet element to the ElementaryComponent.

(1-2) Function of Layer of the Level 2

Figure 8:
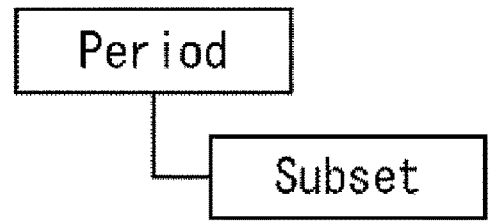
FIG. 8 is a diagram illustrating a relationship between a Period element and a Subset element.

The function of the layer of the level 2 of FIG. 7 can be implemented by performing mapping to the Subset element of MPD. Here, as illustrated in FIG. 8, in the MPD, it is possible to include a plurality of the Subset elements in the Period element. The Subset elements are for specifying a pair of active AdaptationSet elements. Here, the active AdaptationSet element is defined as an AdaptationSet element being in a state in which at least one component is played, among components listed in the Representation elements included under the AdaptationSet element. Further, the pair of AdaptationSet elements refers to a pair or a set of components which are simultaneously played.

In the Subset element, the value of the id attribute of the AdaptationSet element is stored as a list, in the contains-attribute of the Subset element, in order to specify the set of AdaptationSet elements. FIG. 9 illustrates a description example of the Subset element and the contains-attribute. In the MPD of FIG. 9, five AdaptationSet elements (id='1', '12', '65', '74', and '385') and two Subset elements are described as the lower elements of the Period element.

In FIG. 9, '1 and 65' are designated in the contains-attribute of one Subset element, the AdaptationSet element of id='1' and the AdaptationSet element of id='65' indicate the set of the AdaptationSet elements which are played simultaneously. Further, in FIG. 9, '12 74 385' are designated in the contains-attribute of the other Subset element, and the AdaptationSet element of id='12', the AdaptationSet element of id='74', and the AdaptationSet element of id='385' indicate the set of the AdaptationSet elements which are played simultaneously.

Figure 10:
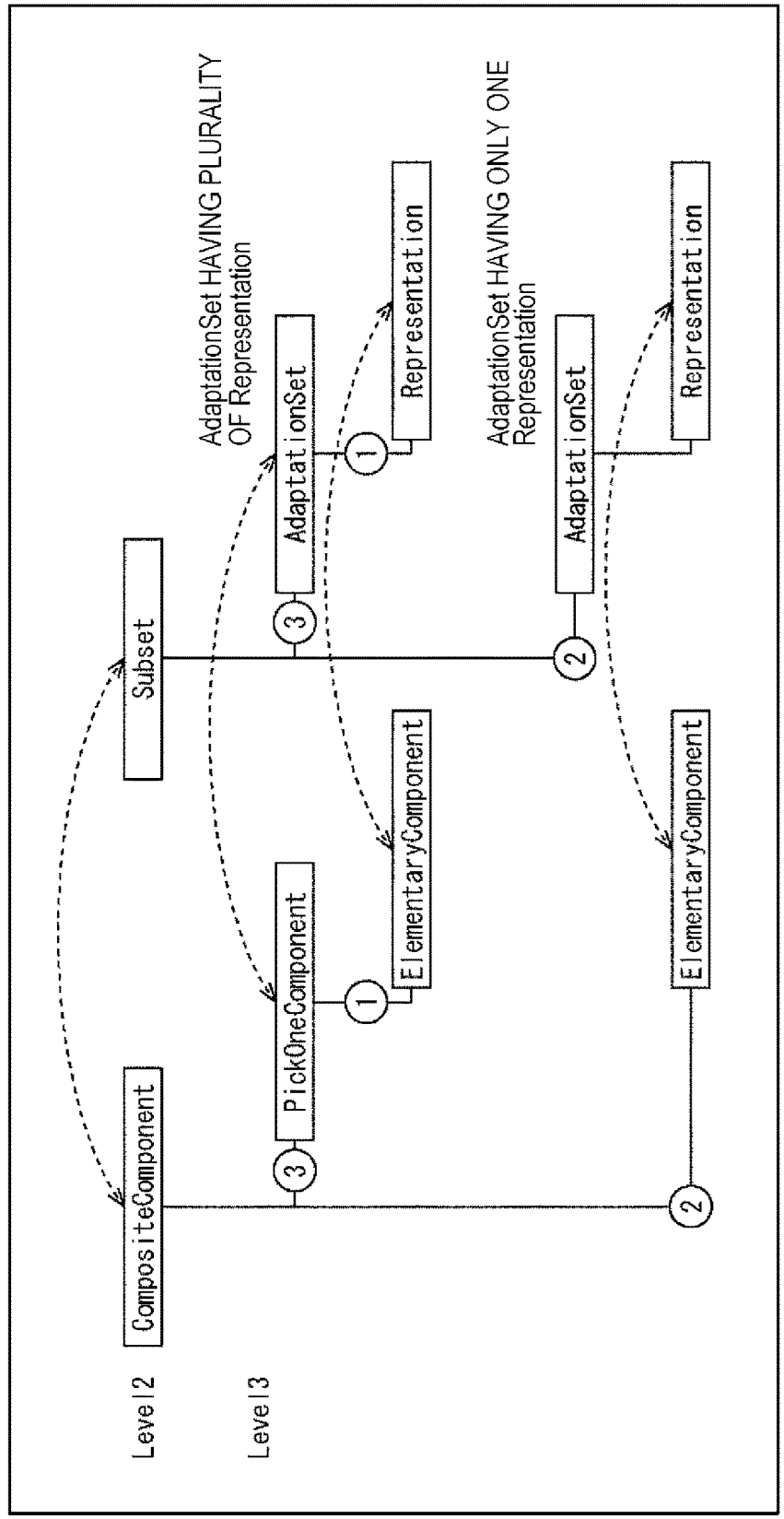
FIG. 10 is a diagram illustrating an association example of a plurality of AdaptationSet elements by the contains-attribute of the Subset element in a layer of the level 2.

In this manner, the function of the layer of the level 2 can be implemented by performing the association of a plurality of AdaptationSet elements, by the contains-attribute of the Subset element. FIG. 10 illustrates an association example of a plurality of AdaptationSet elements by the contains-attribute of the Subset element of the layer of the level 2.

In FIG. 10, it is assumed that in the layer of the CompositeComponent of the level 2, a component selected among a plurality of ElementaryComponents in the layer of the PickOneComponent of the level 3 and an ElementaryComponent are grouped.

In order to implement grouping of the layer of the level 2, the layer of the CompositeComponent is mapped to the Subset element of MPD. Here, the pair of AdaptationSet elements is designated by the set of the components which are simultaneously played by the contains-attribute of the Subset element.

In the example of FIG. 10, a plurality of Representation elements are disposed under one AdaptationSet element, and a plurality of components are listed corresponding to the plurality of Representation elements. Then, since the AdaptationSet element is mapped to the PickOneComponent of the level 3 and the Representation element is mapped to the ElementaryComponent, the relationship represented as "1" in FIG. 10 between the ElementaryComponent and the PickOneComponent of the level 3 can be represented by the relationship between the Representation element corresponding to the ElementaryComponent and the AdaptationSet element corresponding to the PickOneComponent of the level 3.

Further, the relationship represented as "3" in FIG. 10 between the PickOneComponent of the level 3 and the CompositeComponent can be represented by the relationship between the contains-attribute of the Subset element corresponding to the CompositeComponent and the AdaptationSet element corresponding to the PickOneComponent of the level 3.

Only one Representation element is disposed under the other AdaptationSet element, and one component is disposed corresponding thereto. In this case, the relationship represented as "2" in FIG. 10 between the ElementaryComponent and the CompositeComponent can be represented by the relationship between the contains-attribute of the Subset element corresponding to the CompositeComponent and the AdaptationSet element corresponding to the ElementaryComponent.

In other words, since the value of the id attribute of one AdaptationSet element and the value of the id attribute of the other AdaptationSet element are designated in the contains-attribute of the Subset element of the MPD, the components listed in the Representation elements under the AdaptationSet elements are simultaneously played. Thus, since the component selected in the layer of the PickOneComponent of the level 3 and the ElementaryComponent are grouped in the layer of the CompositeComponent, the function of the layer of the level 2 is implemented.

(1-3) Function of Layer of Level 1

Some of the functions of the layer of the level 1 of FIG. 7 can be implemented by performing mapping to the group attribute of the AdaptationSet element of the MPD. Since the group attribute of the AdaptationSet element is for grouping the AdaptationSet element, the AdaptationSet element having the same attribute value belongs to the same group. Then, one AdaptationSet element is selected from a plurality of AdaptationSet elements in the same group.

FIG. 11 illustrates a description example of the group attribute of the AdaptationSet element. In the MPD of FIG. 11, five AdaptationSet elements (id='1', '12', '65', '74', and '385') are described as the lower elements of the Period element.

In FIG. 11, the attribute value of either group='1' or group='2' is designated as the group attribute of the five AdaptationSet elements. In other words, since the AdaptationSet element of id='1' and the AdaptationSet element of id='65' which are designated as group='1' have the same attribute value, the component listed in the Representation element under any one AdaptationSet element is played.

Further, since the AdaptationSet element of id='12', the AdaptationSet element of id='74', and the AdaptationSet element of id='385' which are designated as group='2' have the same attribute value, only one component is played among components listed in the Representation elements under the AdaptationSet elements.

Figure 12:
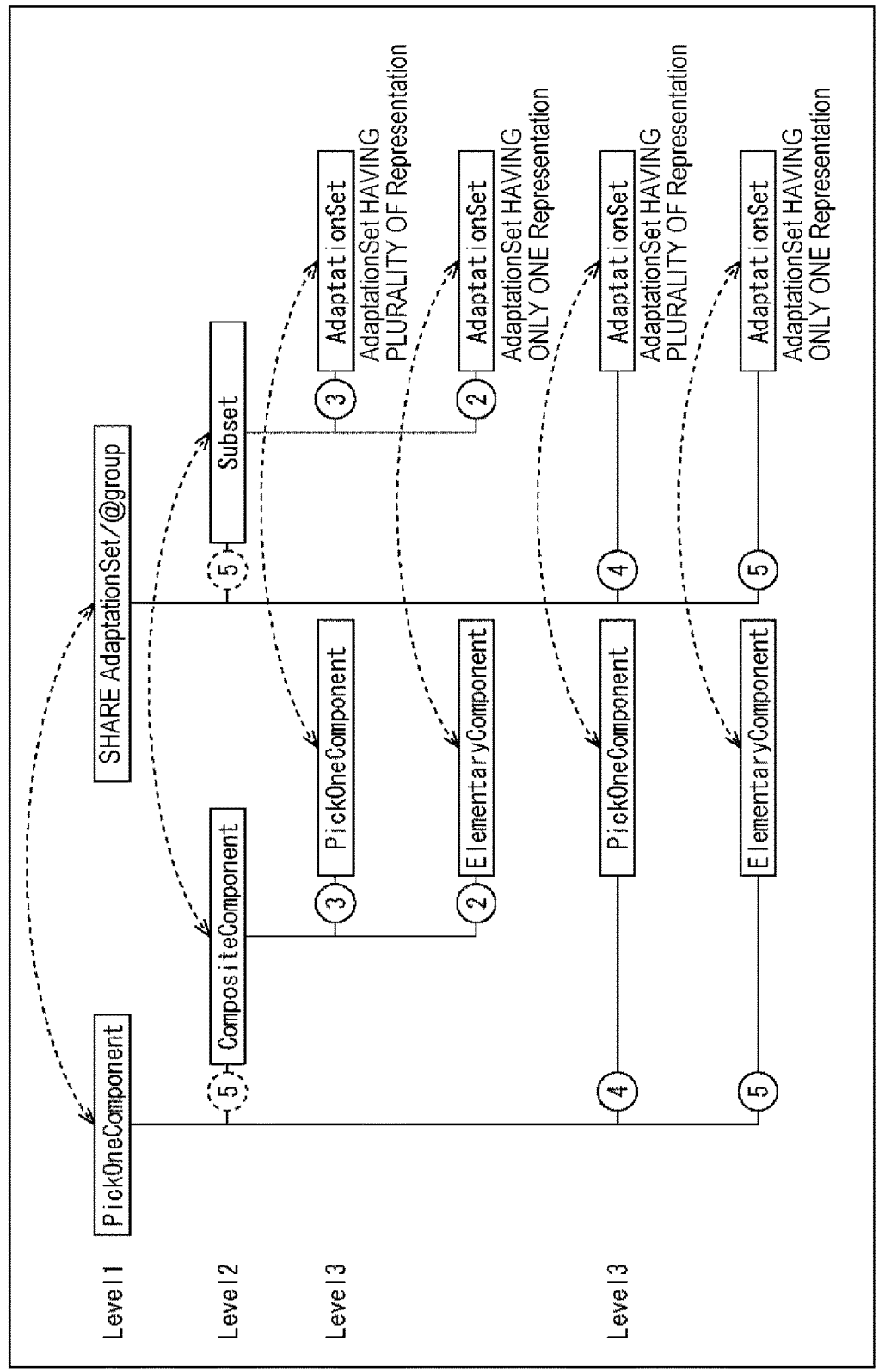
FIG. 12 is a diagram illustrating a grouping example of a plurality of AdaptationSet elements by the group attribute of the AdaptationSet element of a layer of the level 1.

In this manner, it is possible to implement the function of the layer of the level 1 by grouping a plurality of AdaptationSet elements by the group attribute of the AdaptationSet element. FIG. 12 illustrates a grouping example of a plurality of AdaptationSet elements by the group attribute of the AdaptationSet element of the layer of the level 1.

In FIG. 12, it is assumed that one component is selected from components that are grouped in the layer of the CompositeComponent of the level 2, the component that is selected from the plurality of ElementaryComponents in the layer of the PickOneComponent of the level 3, or the ElementaryComponent, in the layer of the PickOneComponent of the level 1.

In order to implement the grouping of the layer of the level 1, the layer of the PickOneComponent of the level 1 is mapped to the group attribute of the AdaptationSet element of the MPD. Here, the attribute value of the same group attribute is designated in the AdaptationSet element belonging to the same group, by the group attribute of the AdaptationSet element, and thus the group is shared.

In FIG. 12, similar to FIG. 10, the association of a plurality of AdaptationSet elements is performed by the contains-attribute of the Subset element, and thus the function of the layer of the level 2 is implemented. In other words, since the id attribute value of one AdaptationSet element and the id attribute value of the other AdaptationSet element are designated in the contains-attribute of the Subset element of the MPD, the components listed in the Representation element under the AdaptationSet elements are played simultaneously. Thus, since the component selected in the layer of the PickOneComponent of the level 3 and the ElementaryComponent are grouped in the layer of the CompositeComponent, the function of the layer of the level 2 is implemented.

Further, in the example of FIG. 12, two AdaptationSet elements are disposed other than the AdaptationSet elements associated by the contains-attribute of the Subset element. Among the two AdaptationSet elements, a plurality of Representation elements are disposed under one AdaptationSet element, and a plurality of components are listed corresponding to the plurality of Representation elements. Then, the AdaptationSet element is mapped to the PickOneComponent of the level 3, and the Representation element thereunder is mapped to the ElementaryComponent. Further, the relationship represented as "4" in FIG. 12 between the PickOneComponent of the level 3 and the PickOneComponent of the level 1 is represented by the group attribute of the AdaptationSet element.

Further, in the example of FIG. 12, among two AdaptationSet elements other than the AdaptationSet elements associated by the contains-attribute of the Subset element, only one Representation element is disposed and one component corresponding thereto is disposed under the other AdaptationSet element. Then, the AdaptationSet element and the Representation element thereunder are mapped to the ElementaryComponent. Further, the relationship represented as "5" of a solid line in FIG. 12 between the ElementaryComponent and the PickOneComponent of the level 1 is represented by the group attribute of the AdaptationSet element.

In other words, since it is possible to group two AdaptationSet elements other than the AdaptationSet elements associated by the contains-attribute of the Subset element, by the group attribute of the AdaptationSet element of the MPD, one component is selected from the components listed in the Representation element under the AdaptationSet elements. Thus, in the layer of the PickOneComponent of the level 1, the component selected in the layer of the PickOneComponent of the level 3 and the ElementaryComponent are grouped.

However, it is not possible to group the AdaptationSet elements associated by the contains-attribute of the Subset element, by the group attribute of the AdaptationSet element of the MPD. In other words, even if using the group attribute of the AdaptationSet element corresponding to the layer of the PickOneComponent of the level 1, it is not possible to associate the CompositeComponent of the level 2 denoted by "5" of the solid line in FIG. 12 and the PickOneComponent of the level 1.

<Expansion of MPD>

In this manner, in the standard specification of the current MPD, it is not possible to perform the association with the Subset element corresponding to the CompositeComponent of the level 2 belonging to the group designated by the group attribute of the AdaptationSet element corresponding to the PickOneComponent of the level 1. Thus, the expansion of the MPD is performed in order to enable the association between the values of such group attributes and the Subset elements, thereby allowing the function of the layer of the level 1 to be fully implemented.

Specifically, a new group attribute is added in the Subset element by the expansion of the MPD. FIG. 13 illustrates a description example in which a group attribute is added in the Subset element. In the expanded MPD of FIG. 13, six AdaptationSet elements (id='1', '10', '12', '65', '74', and '385') and three Subset elements are described as the lower elements of the Period element.

In FIG. 13, '1 10' is designated in the contains-attribute of a first Subset element, and this indicates that the AdaptationSet element of id='1' and the AdaptationSet element of id='10' are the set of the AdaptationSet elements to be simultaneously played. Further, '1' is designated in the group attribute of the first Subset element, and this indicates that the pair of the AdaptationSet element of id='1' and the AdaptationSet element of id='10' belongs to a group 1.

Further, '12 74' is designated in the contains-attribute of a second Subset element, and this indicates that the AdaptationSet element of id='12' and the AdaptationSet element of id='74' are the set of the AdaptationSet elements to be simultaneously played. Further, '2' is designated in the group attribute of the second Subset element, and this indicates that the pair of the AdaptationSet element of id='12' and the AdaptationSet element of id='74' belongs to a group 2.

Further, '65 385' is designated in the contains-attribute of a third Subset element, and this indicates that the AdaptationSet element of id='65' and the AdaptationSet element of id='385' are the set of the AdaptationSet elements to be simultaneously played. Further, '2' is designated in the group attribute of the third Subset element, and this indicates that the pair of the AdaptationSet element of id='65' and the AdaptationSet element of id='385' belongs to the group 2.

In other words, in the example of FIG. 13, since the second Subset element and the third Subset element have the same group attribute value '2', either the pair of the AdaptationSet element of id='12' and the AdaptationSet element of id='74' designated by the contains-attribute of the second Subset element or the pair of the AdaptationSet element of id='65' and the AdaptationSet element of id='385' designated by the contains-attribute of the third Subset element is selected.

In this manner, it is possible to represent the relationship represented as "5" of a dotted line in FIG. 12 between the CompositeComponent of the level 2 and the PickOneComponent of the level 1 by performing the expansion of the MPD that adds a group attribute in the Subset element. As a result, since the relationship represented as "5" of the dotted line in FIG. 12 between the CompositeComponent of the level 2 and the PickOneComponent of the level 1, the relationship represented as "4" between the PickOneComponent of the level 3 and the PickOneComponent of the level 1, and the relationship represented as "5" of the solid line in FIG. 12 between the ElementaryComponent and the PickOneComponent of the level 1 are satisfied, the function of the layer of the level 1 is implemented.

(2) Specific Operation Example

Next, specific operation examples of the first embodiment will be described with reference to FIG. 14 to FIG. 16.

(2-1) Operation Example 1

Figure 14:
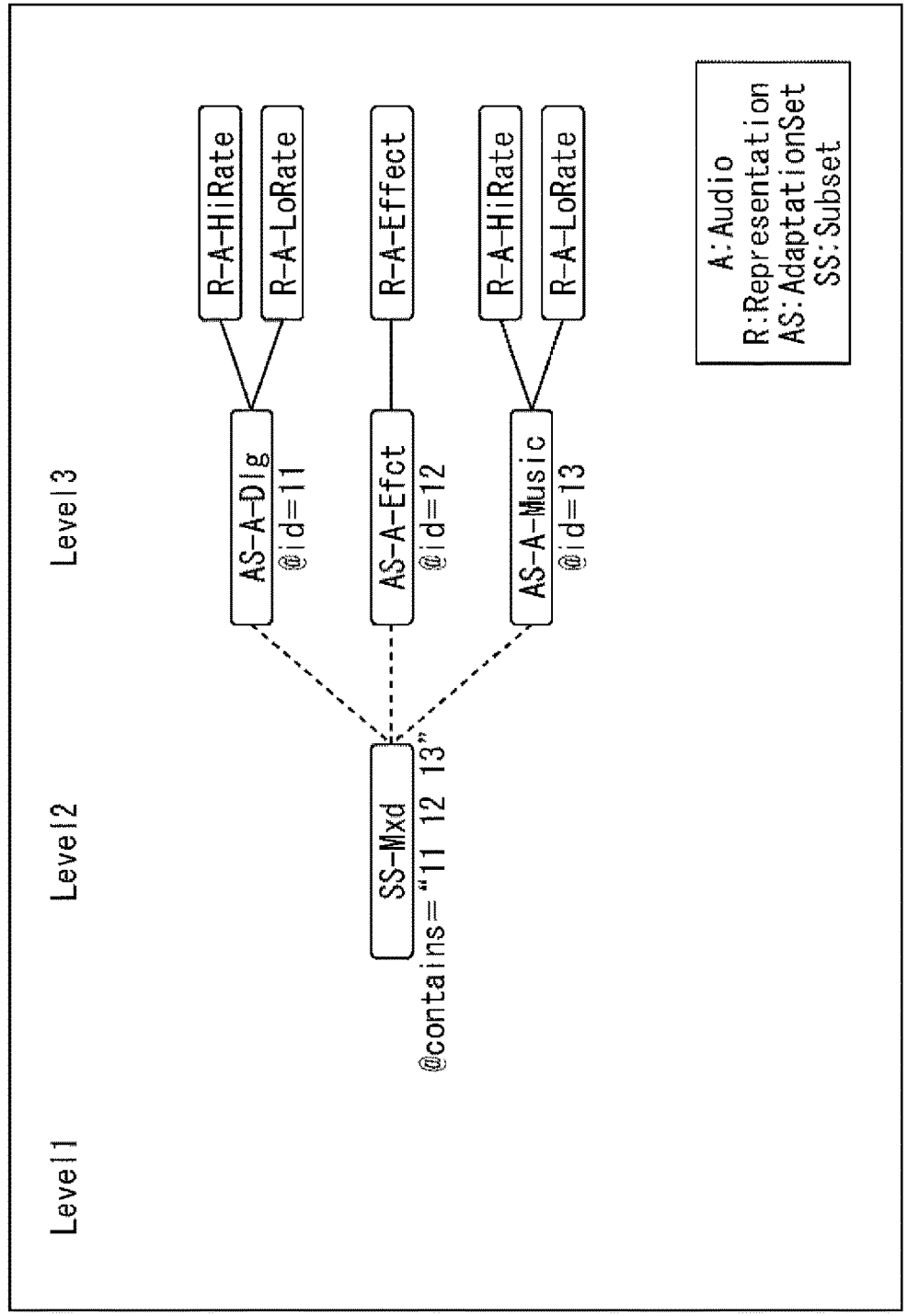
FIG. 14 is a diagram illustrating Operation example 1.

FIG. 14 is a diagram illustrating Operation example 1 of performing the mixing playback of an audio stream. In FIG. 14, the contents of the description of the MPD for implementing the Operation example 1 is illustrated, "AS" represents an AdaptationSet element, "R" represents a Representation element, and "SS" represents a Subset element, respectively. Further, in FIG. 14, "@" means an attribute, "@id" represents an id attribute of the AdaptationSet element, and "@contains" represents the contains-attribute of the Subset element. Further, "A" of the Representation element represents an audio component. In addition, the relationships of these abbreviations are the same in other drawings described below.

In the MPD of FIG. 14, three AdaptationSet elements (id='11', '12', and '13') corresponding to a single audio stream are described, and one or a plurality of Representation elements are described under the AdaptationSet elements.

Two Representation elements are described under the AdaptationSet element of id='11'. Dialogs (Dlg) are listed as audio components having different bit rates, in a range of the AdaptationSet element of id='11' which is a higher element, by the Representation elements. In this example, a dialog of a high bit rate and a dialog of a low bit rate are listed, and one audio component is adaptively selected, for example, depending on the environmental conditions of a network and the like, in the layer of the level 3 (PickOneComponent).

Only one Representation element is described under the AdaptationSet element of id='12'. Effect (Efct) is listed as an audio component, by the Representation elements. Accordingly, one audio component is typically selected. In addition, the audio component selected in this manner corresponds to the ElementaryComponent.

Two Representation elements are described under the AdaptationSet element of id='13'. A plurality of pieces of music are listed as audio components having different bit rates, in a range of the AdaptationSet element of id='13' which is a higher element, by the Representation elements. In this example, music of a high bit rate and music of a low bit rate are listed, and one audio component is adaptively selected, for example, depending on the environmental conditions of a network and the like, in the layer of the level 3 (PickOneComponent).

In this manner, in the MPD of FIG. 14, since the PickOneComponent is mapped to the AdaptationSet element and the Representation elements listed in the AdaptationSet element are mapped to the ElementaryComponent, the function of the layer of the level 3 in the component layer structure of FIG. 7 is implemented, and the selection of the audio component is performed.

Further, in the MPD of FIG. 14, '11 12 13' are designated in the contains-attribute of the Subset element, and this indicates that the AdaptationSet element of id='11', the AdaptationSet element of id='12', and the AdaptationSet element of id='13' are respectively a set of AdaptationSet elements to be mixed. In this manner, since the association of a plurality of AdaptationSet elements is performed by the contains-attributes of the Subset elements, the function of the layer of the level 2 in the component layer structure of FIG. 7 is implemented, and the mixing of the audio components is performed in the layer of the level 2 (CompositeComponent).

Thus, in the Operation example 1 of FIG. 14, the function of the layer of the level 3 in the component layer structure of FIG. 7 is implemented by mapping the PickOneComponent to the AdaptationSet element, and mapping the Representation elements listed in the AdaptationSet element to the ElementaryComponent. Further, the function of the layer of the level 2 is implemented by performing the association of the plurality of AdaptationSet elements by the contains-attributes of the Subset elements. In this manner, since the functions of the layer of the level 2 and the layer of the level 3 are implemented, the mixing playback of the audio streams is performed.

(2-2) Operation Example 2

Figure 15:
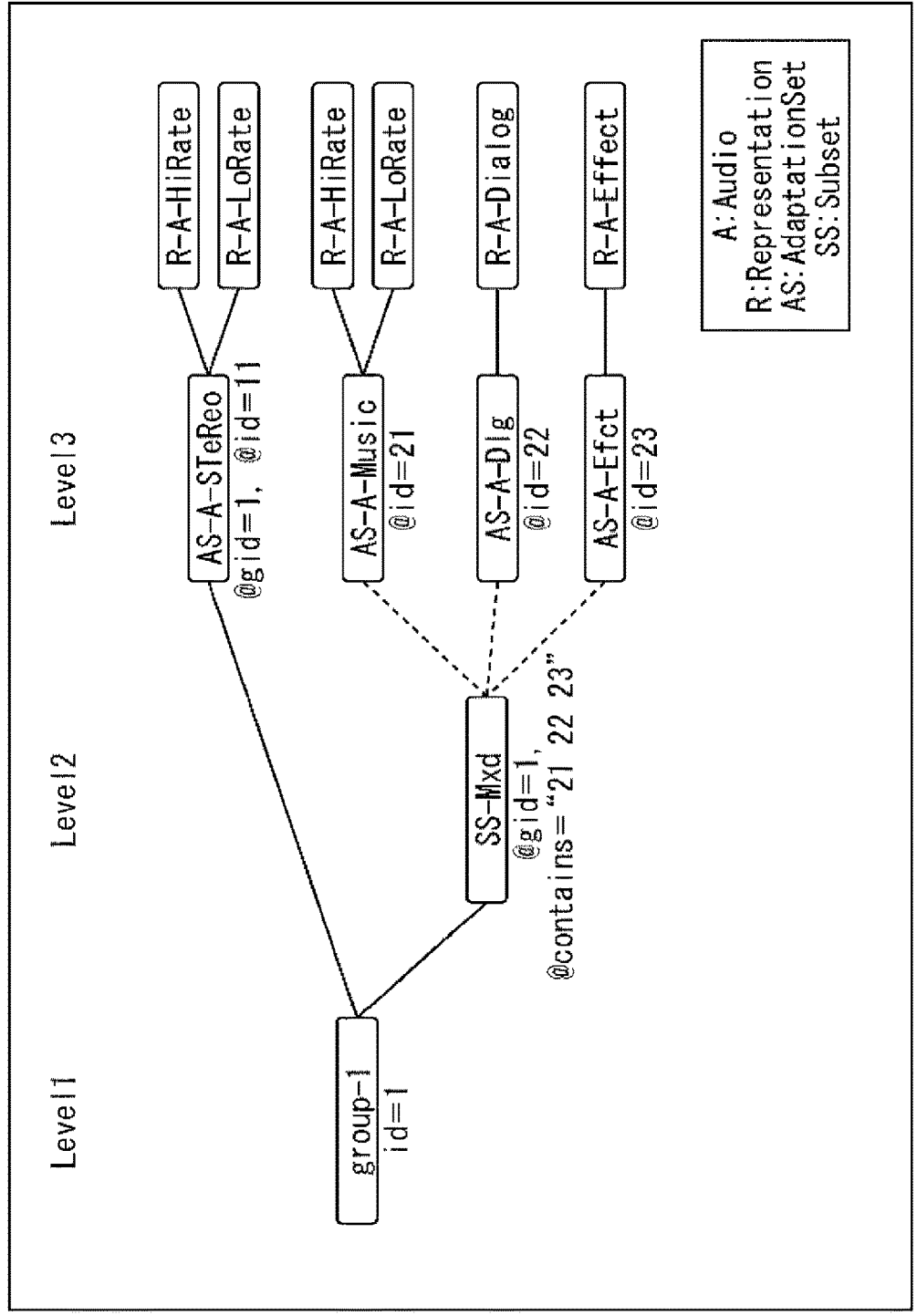
FIG. 15 is a diagram illustrating Operation example 2.

FIG. 15 is a diagram illustrating Operation example 2 of performing group selection of an audio stream. In FIG. 15, the contents of the description of the MPD for implementing the Operation example 2 is illustrated, and similar to FIG. 14, "AS", "R", and "SS" respectively represent the AdaptationSet element, the Representation element, and the Subset element. Further, a group attribute represented as "@gid" in addition to the id attribute is described in the AdaptationSet element, and a group attribute represented as "@gid" in addition to the contains-attribute is described in the Subset element. In addition, the relationships of these abbreviations are the same in other drawings described below.

In the MPD of FIG. 15, four AdaptationSet elements (id='11', '21', '22', and '23') corresponding to a single audio stream are described, and one or a plurality of Representation elements are described under the AdaptationSet elements.

Two Representation elements are described under the AdaptationSet element of id='11', Stereos of a high bit rate and a low bit rate are listed as audio components having different bit rates, and one audio component is adaptively selected, for example, depending on the environmental conditions of a network and the like, in the layer of the level 3 (PickOneComponent).

In this manner, the function of the layer of the level 3 in the component layer structure of FIG. 7 is implemented by mapping the PickOneComponent to the AdaptationSet element, and the selection of the audio component is performed. In addition, here, since the grouping such as mixing of the audio component is not performed, the description for implementing the function of the level 2 is not performed.

Two Representation elements are described under the AdaptationSet element of id='21', two pieces of music of a high bit rate and a low bit rate are listed as audio components having different bit rates, and one audio component is adaptively selected, for example, depending on the environmental conditions of a network and the like, in the layer of the level 3 (PickOneComponent).

Only one Representation element is described under the AdaptationSet element of id='22', Dialog ((Dlg)) is listed as an audio component, and one audio component is typically selected. The audio component selected in this manner corresponds to the ElementaryComponent.

Only one Representation element is described under the AdaptationSet element of id='23', Effect (Efct) is listed as an audio component, and one audio component is typically selected. The audio component selected in this manner corresponds to the ElementaryComponent.

In this manner, the function of the layer of the level 3 in the component layer structure of FIG. 7 is implemented by mapping the PickOneComponent to the AdaptationSet element, and mapping the Representation elements listed in the AdaptationSet element to the ElementaryComponent, and the selection of the audio component is performed.

Further, in the MPD of FIG. 15, '21 22 23' is designated in the contains-attribute of the Subset element, and this indicates that the AdaptationSet element of id='21', the AdaptationSet element of id='22', and the AdaptationSet element of id='23' are respectively a set of AdaptationSet elements to be mixed. In this manner, since the association of a plurality of AdaptationSet elements is performed by the contains-attributes of the Subset elements, the function of the layer of the level 2 in the component layer structure of FIG. 7 is implemented, and the mixing of the audio components is performed in the layer of the level 2 (CompositeComponent).

Here, in the MPD of FIG. 15, group='1' is designated as the group attribute in the AdaptationSet element of id='11'. Further, group='1' is designated as the group attribute in the Subset element. Accordingly, the AdaptationSet element of id='11', and the AdaptationSet element of id='21', the AdaptationSet element of id='22', and the AdaptationSet element of id='23' which are designated by the Subset element belong to the same group 1.

In this manner, the function of the layer of the level 1 in the component layer structure of FIG. 7 is implemented by performing grouping by the group attribute, and one audio component is selected from the audio components in the same group, in the layer of the level 1 (PickOneComponent). Here, the audio component (Stereo) selected in the layer of the level 3 (PickOneComponent) belonging to the group 1 and any one audio component among audio components (Music, Dialog, and Effect) mixed in the layer of the level 2 (CompositeComponent) are selected.

Thus, in the Operation example 2 of FIG. 15, the function of the layer of the level 3 in the component layer structure of FIG. 7 is implemented by mapping the PickOneComponent to the AdaptationSet element, and mapping the Representation elements listed in the AdaptationSet element to the ElementaryComponent. Further, the function of the layer of the level 2 is implemented by performing the association of the plurality of AdaptationSet elements by the contains-attributes of the Subset elements. Further, the function of the layer of the level 1 is implemented by grouping a plurality of AdaptationSet elements by the group attributes of the AdaptationSet element and the Subset element. In this manner, since the functions of the layers of the level 1, the level 2 and the level 3 are implemented, the group selection of the audio component is performed, and the audio component is played.

(2-3) Operation Example 3

Figure 16:
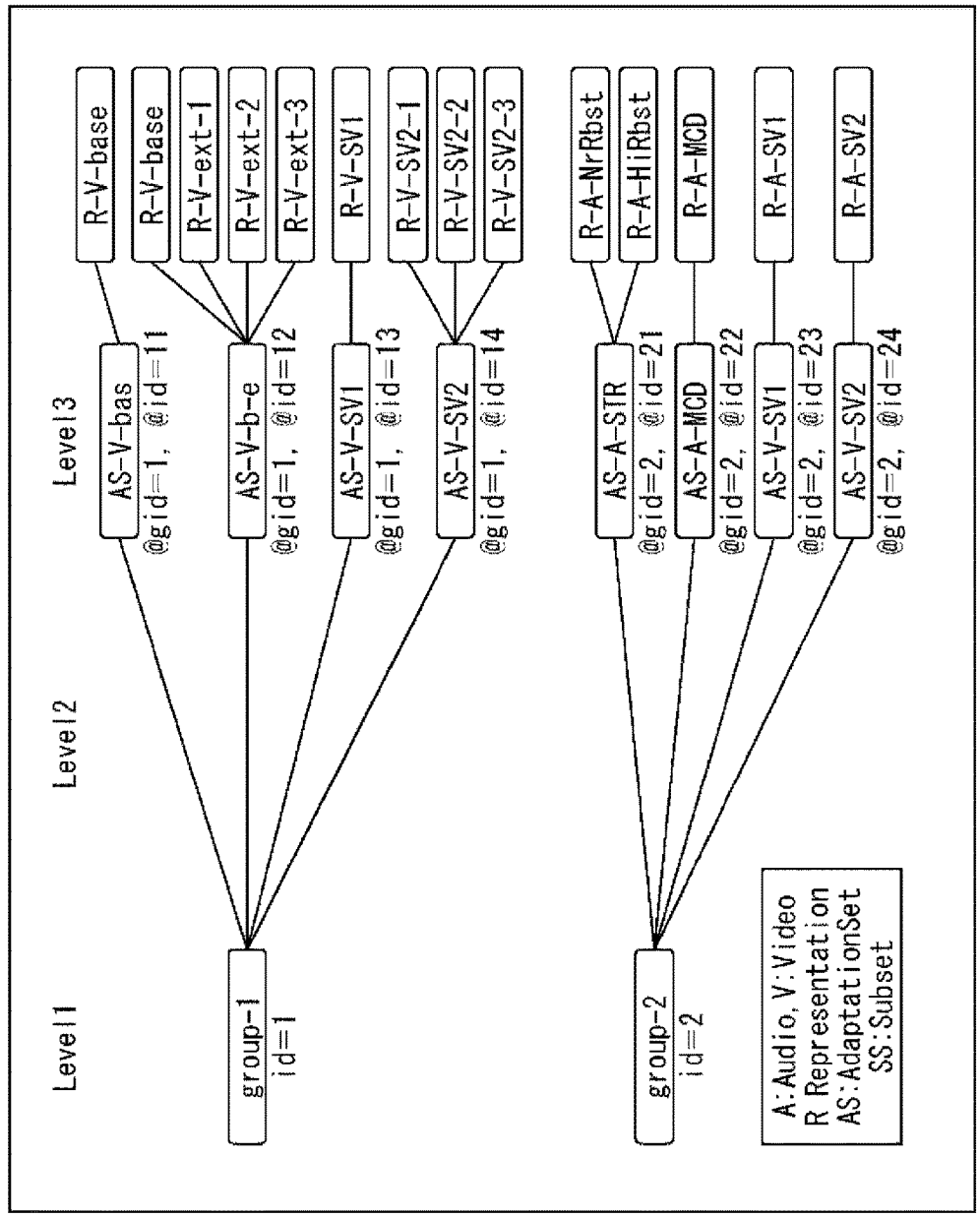
FIG. 16 is a diagram illustrating Operation example 3.

FIG. 16 is a diagram illustrating Operation example 3 of performing playback of a video component and an audio component. In FIG. 16, the contents of the description of the MPD for implementing the Operation example 3 is illustrated, and similar to FIG. 14 and FIG. 15, and "AS" and "R" respectively represent the AdaptationSet element and the Representation element. Further, similar to FIG. 15, an id attribute represented as "@id" and a group attribute represented as "@gid" are described in the AdaptationSet element. In addition, "V" in the Representation element represents a video component.

In the MPD of FIG. 16, four AdaptationSet elements (id='11', '12', '13', and '14') belonging to a group 1 of a video and four AdaptationSet elements (id='21', '22', '23', and '24') belonging to a group 2 of audio are described, and one or a plurality of Representation elements are respectively described under the AdaptationSet elements.

In the group 1 of the video, "base", "ext", "SV1", and "SV2" are listed as video components in respective Representation elements. Here, "base" represents a video component corresponding to a basic video signal that can be played alone, and "ext" represents a video component corresponding to a video signal for expansion. Further, in "SV1" and "SV2", "SV" is an abbreviation of SubView, and represents a subview which is an auxiliary area of a main view which is a main display area.

Under the AdaptationSet element of id='11', only one Representation element is described, and one video component corresponding to the basic video signal that can be played alone is typically selected. The video component selected in this way corresponds to the ElementaryComponent. In addition, the video component is for the main view.

Under the AdaptationSet element of id='12', four Representation elements are described, one video component corresponding to the basic video signal and three video components corresponding to the video signals for expansion are listed, and a relationship is shown in which the video components corresponding to the video signals for expansion are referred to in the video component corresponding to the basic video signal by the Representation element. Accordingly, the video components corresponding to the basic video signal and the video signal for expansion are selected, for example, depending on the environmental conditions of a network and the like, in the layer of the level 3 (PickOneComponent). In addition, the video component is for the main view.

Under the AdaptationSet element of id='13', only one Representation element is described, and one video component for a subview 1 is typically selected. The video component selected in this way corresponds to the ElementaryComponent.

Under the AdaptationSet element of id='14', three Representation elements are described, three video components for a subview 2 are listed, and one video component is adaptively selected, for example, depending on the environmental condition of a network and the like, in the layer of the level 3 (PickOneComponent).

In this manner, the function of the layer of the level 3 in the component layer structure of FIG. 7 is implemented, and the selection of the video component is performed, by mapping the PickOneComponent to the AdaptationSet element, and mapping the Representation elements listed in the AdaptationSet element to the ElementaryComponent.

Here, in the MPD of FIG. 16, group='1' is designated in the AdaptationSet element of id='11', the AdaptationSet element of id='12', the AdaptationSet element of id='13', and the AdaptationSet element of id='14', and the AdaptationSet elements belong to the same group 1.

In this manner, the function of the layer of the level 1 in the component layer structure of FIG. 7 is implemented by performing grouping by the group attributes, and one video component is selected from video components belonging to the same group, in the layer of the level 1 (PickOneComponent). Here, one video component is selected from the video component that belongs to the group 1 and is selected in the layer of the level 3 (PickOneComponent) and the ElementaryComponent.

Meanwhile, in the group 2 of audio, "NrRbst", "HiRbst", "MCD", "SV1", and "SV2" are listed as audio components in respective Representation elements. "NrRbst" and "HiRbst" represent audio components having robustness. In other words, "NrRbst" is an abbreviation of Normal Robustness, and means an audio component having normal robustness. Further, "HiRbst" is an abbreviation of High Robustness, and means an audio component having high robustness.

Further, "MCD" is an abbreviation of Multi-channel Dev, and represents a multi-channel audio component. Further, in "SV1" and "SV2", "SV" is an abbreviation of subview and represents an audio component for subview.

Under the AdaptationSet element of id='21', two Representation elements are described, an audio component having normal robustness and an audio component having high robustness are listed, and one audio component is adaptively selected, for example, depending on the environmental condition of a network and the like, in the layer of the level 3 (PickOneComponent). In addition, the audio component is for the main view.

Under the AdaptationSet element of id='22', only one Representation element is described, and one multi-channel audio component is typically selected. The audio component selected in this way corresponds to the ElementaryComponent. In addition, the audio component is for the main view.

Under the AdaptationSet element of id='23', only one Representation element is described, and one audio component for subview 1 is typically selected. Similarly, under the AdaptationSet element of id='24', one audio component for subview 2 is typically selected. The audio components for subview selected in this way correspond to the ElementaryComponent.

Here, in the MPD of FIG. 16, group='2' is designated as the group attribute in the AdaptationSet element of id='21', the AdaptationSet element of id='22', the AdaptationSet element of id='23', and the AdaptationSet element of id='24', and the AdaptationSet elements belong to the same group 2.

In this manner, the function of the layer of the level 1 in the component layer structure of FIG. 7 is implemented by performing grouping by the group attributes, and one audio component is selected from audio components in the same group, in the layer of the level 1 (PickOneComponent). Here, one audio component is selected from the audio component that belongs to the group 2 and is selected in the layer of the level 3 (PickOneComponent) and the ElementaryComponent.

Thus, in the Operation example 3 of FIG. 16, for each of a video and audio, the function of the layer of the level 3 in the component layer structure of FIG. 7 is implemented by mapping the PickOneComponent to the AdaptationSet element, and mapping the Representation elements listed in the AdaptationSet element to the ElementaryComponent. Further, for each of a video and audio, the function of the layer of the level 1 is implemented by grouping a plurality of AdaptationSet elements by the group attribute of the AdaptationSet element. In this manner, since the functions of the layers of the level 1 and the level 3 are implemented, the selection of the video component and the audio component is performed, and the video component and the audio component are respectively played.

4. Second Embodiment

(1) Implementation Method of Function of Layer of Each Level

Also in a second embodiment, in a case of providing a broadcast service by using the MPEG-DASH method, it is possible to use elements which have already been defined in the standard specification of the MPD, in order to satisfy the service requirement of the component layer structure of FIG. 7. Hereinafter, an implementation method of a function of a layer of each level of the second embodiment will be described.

(1-1) Function of Layer of the Level 3

The function of the layer of the level 3 of FIG. 7 can be implemented by mapping the PickOneComponent to the AdaptationSet element of the MPD and mapping Representation elements or SubRepresentation elements which are listed in the AdaptationSet element to the ElementaryComponent.

(1-2) Function of Layer of the Level 2

The function of the layer of the level 2 of FIG. 7 can be implemented by performing mapping to a dependency description attribute that defines a relationship between the AdaptationSet elements of the MPD, a relationship between the Representation elements, or a relationship between the SubRepresentation elements.

As the dependency description attribute, a new element is defined by using the EssentialProperty element (FIG. 5) which is the lower element than the AdaptationSet element defined in the MPD and a SupplementalProperty element (FIG. 5), and an AdaptationSet attribute group can be grouped. For example, the AdaptationSet attribute group of the audio components that are to be simultaneously played, such as the mixing playback of audio streams, and the AdaptationSet attribute group of the video components that have the Base-Enhance relationship can be grouped.

Figure 17:
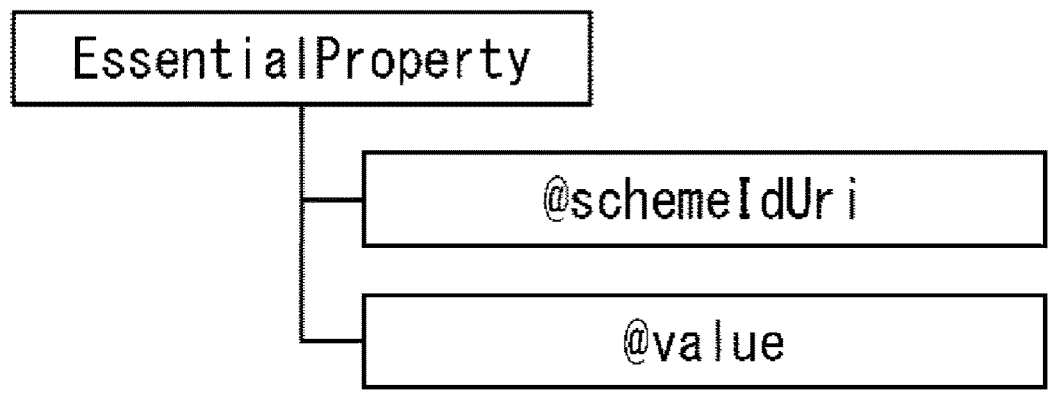
FIG. 17 is a diagram illustrating a relationship between an EssentialProperty element and an attribute thereof.

Here, a case of using the EssentialProperty element as the dependency description attribute will be described as an example. As illustrated in FIG. 17, the EssentialProperty element is configured with a schemeIdUri attribute and a value attribute of which value (URI: Uniform Resource Identifier) is determined according to a format defined by the value of the schemeIdUri attribute. In addition, the value attribute is an optional attribute.

For example, "urn:ATSC" is defined as a name space authority, and an Uri attribute value of "urn:ATSC:mixingGroup" defined by the authority is defined. Thus, an AdaptationSet attribute group of the audio component having the EssentialProperty element having the Uri attribute value as the value of the schemeIdUri attribute can be defined to mean that the audio components are mixed and output.

In this case, it is possible to define, for example, a value for identifying an audio component group of which audio component is to be mixed, a relative volume for an entire volume after the audio components are mixed, and the like, in the value attribute. For example, as the relative volume for the entire volume, a fractional value in the range of 0 to 1 is designated when the entire volume is set to 1.

FIG. 18 illustrates a description example of the EssentialProperty element, the schemeIdUri attribute and the value attribute. In the MPD of FIG. 18, as the lower elements of the Period element, two AdaptationSet elements (id='1', '2') are described.

In FIG. 18, "urn:ATSC:mixingGroup" is designated as the value of the schemeIdUri attribute, and "23, 0.37" are designated as the value of the value attribute, in the EssentialProperty element under the AdaptationSet element of id='1'. In other words, the AdaptationSet element of id='1' belongs to a mixing group designated by a group ID of "23", and is designated by a relative volume of "0.37".

Further, in FIG. 18, "urn:ATSC:mixingGroup" is designated as the value of the schemeIdUri attribute, and "23, 0.25" are designated as the value of the value attribute, in the EssentialProperty element under the AdaptationSet element of id='2'. In other words, the AdaptationSet element of id='2' belongs to a mixing group designated by a group ID of "23", and is designated by a relative volume of "0.25".

Thus, the audio component corresponding to the AdaptationSet element of id='1' and the audio component corresponding to the AdaptationSet element of id='2', which belong to a mixing group of "23", are mixed and played. Further, in the mixing playback, the relative volume of the audio component corresponding to the AdaptationSet element of id='1' is "0.37", and the relative volume of the audio component corresponding to the AdaptationSet element of id='2' is "0.25".

Figure 19:
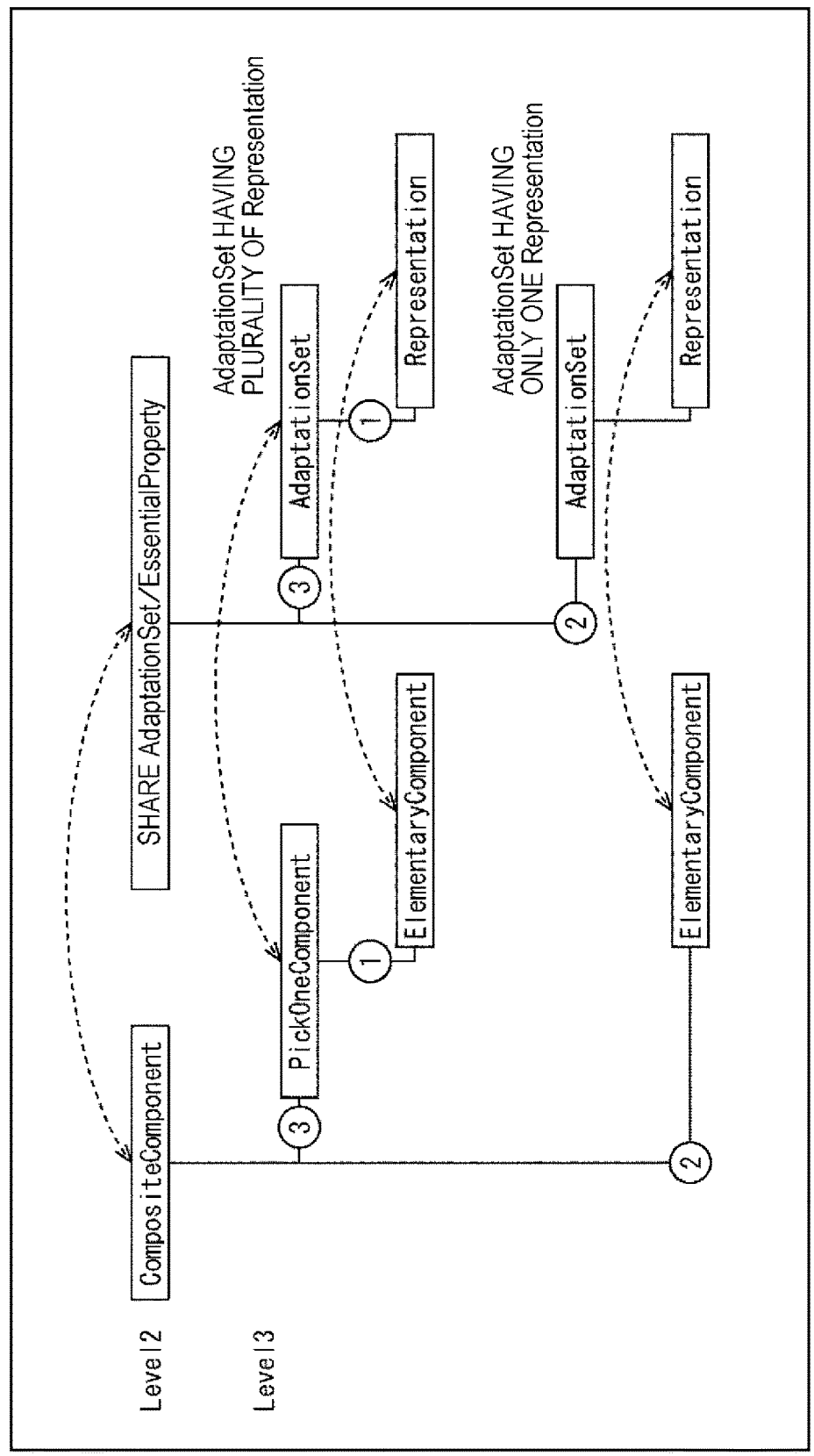
FIG. 19 is a diagram illustrating an association example of a plurality of AdaptationSet elements by the EssentialProperty element and the attribute thereof in the layer of the level 2.

In this manner, it is possible to implement the function of the layer of the level 2 by grouping the EssentialProperty element, and a plurality of AdaptationSet elements by the schemeIdUri attribute and the value attribute. FIG. 19 illustrates a grouping example of the EssentialProperty element, and a plurality of AdaptationSet elements by the schemeIdUri attribute and the value attribute, in the layer of the level 2.

In FIG. 19, it is assumed that the component selected from a plurality of ElementaryComponent in the layer of the PickOneComponent of the level 3 and the ElementaryComponent, in the layer of CompositeComponent of the level 2 are grouped.

In order to implement the grouping of the layer of the level 2, the layer of the CompositeComponent and the EssentialProperty element disposed in the AdaptationSet element of the MPD are mapped. Here, the pair of AdaptationSet elements is designated, as the set of components that are simultaneously played by the schemeIdUri attribute and the value attribute of the EssentialProperty element.

In the example of FIG. 19, a plurality of Representation elements are disposed under one AdaptationSet element, and a plurality of components are listed corresponding to a plurality of Representation elements. Then, since the AdaptationSet element is mapped to the PickOneComponent of the level 3 and the Representation element is mapped to the ElementaryComponent, the relationship represented as "1" in FIG. 19 between the ElementaryComponent and the PickOneComponent of the level 3 can be represented by the Representation element corresponding to the ElementaryComponent and the AdaptationSet element corresponding to the PickOneComponent.

Further, the relationship represented as "3" in FIG. 12 between the PickOneComponent of the level 3 and the CompositeComponent is represented by the relationship between the schemeIdUri attribute and the value attribute of the EssentialProperty element corresponding to the CompositeComponent and the AdaptationSet element corresponding to the PickOneComponent of the level 3.

Under the other AdaptationSet element, only one Representation element is disposed, and one component is disposed corresponding thereto. In this case, the relationship represented as "2" in FIG. 12 between the ElementaryComponent and the CompositeComponent is represented by the relationship between the schemeIdUri attribute and the value attribute of the EssentialProperty element corresponding to the CompositeComponent and the AdaptationSet element corresponding to the ElementaryComponent.

In other words, when the Uri attribute value which is, for example, "urn:ATSC:mixingGroup" is defined for the schemeIdUri attribute of the EssentialProperty element disposed in the AdaptationSet element of the MPD, if "urn:ATSC:mixingGroup" is defined as the value of the schemeIdUri attribute, in each AdaptationSet element, and the same group ID is designated as the value of the value attribute, the audio components under the AdaptationSet elements are mixed and played. Thus, since the component selected in the layer of the PickOneComponent of the level 3 and the ElementaryComponent are grouped in the layer of the CompositeComponent, the function of the layer of the level 2 is implemented.

(1-3) Function of Layer of the Level 1

The function of the layer of the level 1 of FIG. 7 can be implemented by performing mapping to the group attribute of AdaptationSet element of the MPD. Since the group attribute of the AdaptationSet element is for grouping the AdaptationSet element, the AdaptationSet element having the same attribute value belongs to the same group. Then, one AdaptationSet element is selected from a plurality of AdaptationSet elements in the same group.

FIG. 20 illustrates a description example of the group attribute of the AdaptationSet element. In the MPD of FIG. 20, five AdaptationSet elements (id='1', '12', '65', '74', and '385') are described as the lower elements of the Period element.

In FIG. 20, the attribute value of either group='1' or group='2' is designated as the group attribute of the five AdaptationSet elements. In other words, since the AdaptationSet element of id='1' and the AdaptationSet element of id='65' which are designated as group='1' have the same attribute value, the component listed in the Representation element under any one AdaptationSet element is played.

Further, since the AdaptationSet element of id='12', the AdaptationSet element of id='74', and the AdaptationSet element of id='385' which are designated as group='2' have the same attribute value, only one component is played among components listed in the Representation elements under the AdaptationSet elements.

Figure 21:
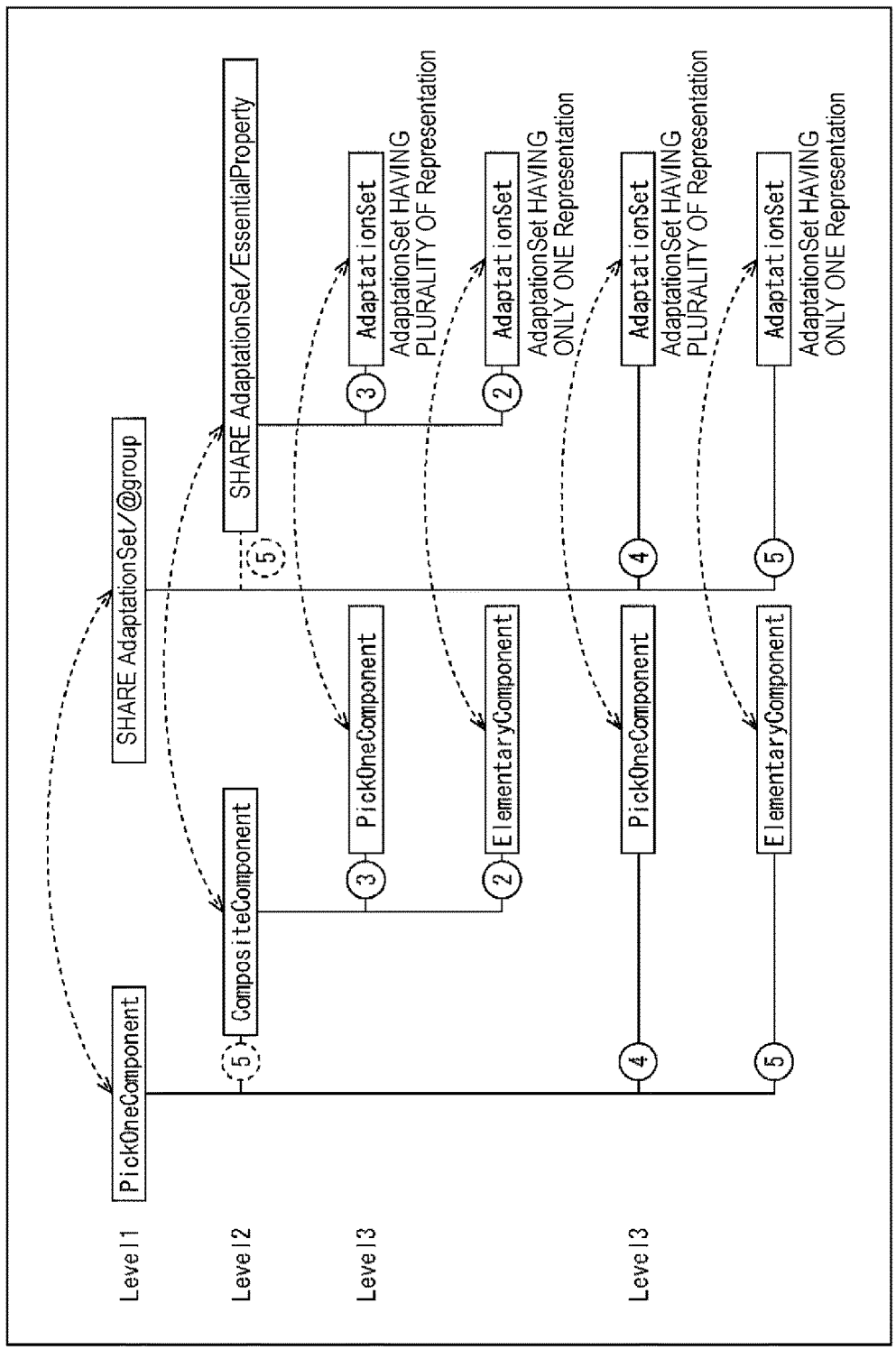
FIG. 21 is a diagram illustrating a grouping example of a plurality of AdaptationSet elements by the group attribute of the AdaptationSet element of the layer of the level 1.

In this manner, it is possible to implement the function of the layer of the level 1 by grouping a plurality of AdaptationSet elements by the group attribute of the AdaptationSet element. FIG. 21 illustrates a grouping example of a plurality of AdaptationSet elements by the group attribute of the AdaptationSet element of the layer of the level 1.

In FIG. 21, it is assumed that one component is selected from components that are grouped in the layer of the CompositeComponent of the level 2, the component that is selected from the plurality of ElementaryComponents in the layer of the PickOneComponent of the level 3, or the ElementaryComponent, in the layer of the PickOneComponent of the level 1.

In order to implement the grouping of the layer of the level 1, the layer of the PickOneComponent of the level 1 is mapped to the group attribute of the AdaptationSet element of the MPD. Here, the attribute value of the same group attribute is designated in the AdaptationSet element belonging to the same group, by the group attribute of the AdaptationSet element, and thus the group is shared.

In FIG. 21, similar to FIG. 19, since the association of a plurality of AdaptationSet elements is performed by the EssentialProperty element, the schemeIdUri attribute, and the value attribute, the function of the layer of the level 2 is implemented.

In other words, when the Uri attribute value which is, for example, "urn:ATSC:mixingGroup" is defined for the schemeIdUri attribute of the EssentialProperty element disposed in the AdaptationSet element of the MPD, if "urn:ATSC:mixingGroup" is defined as the value of the schemeIdUri attribute, in each AdaptationSet element, and the same group ID is designated as the value of the value attribute, the audio components under the AdaptationSet elements are mixed and played.

Thus, since in the layer of the CompositeComponent represented as "5" of a dotted line in FIG. 21, the component selected in the layer of the PickOneComponent of the level 3 and the ElementaryComponent are grouped, the function of the layer of the level 2 is implemented. Further, the relationship represented as "5" of a dotted line in FIG. 21 between the CompositeComponent and the PickOneComponent of the level 1 is represented by the group attribute of the AdaptationSet element.

Further, in the example of FIG. 21, two AdaptationSet elements are disposed other than the AdaptationSet elements associated by the schemeIdUri attribute and the value attribute of the EssentialProperty element. Among the two AdaptationSet elements, a plurality of Representation elements are disposed under one AdaptationSet element, and a plurality of components are listed corresponding to the plurality of Representation elements. Then, the AdaptationSet element is mapped to the PickOneComponent of the level 3, and the Representation element thereunder is mapped to the ElementaryComponent. Further, the relationship represented as "4" in FIG. 21 between the PickOneComponent of the level 3 and the PickOneComponent of the level 1 is represented by the group attribute of the AdaptationSet element.

Further, in the example of FIG. 21, among the two AdaptationSet elements other than the AdaptationSet elements associated by the schemeIdUri attribute and the value attribute of the EssentialProperty element, only one Representation element is disposed under the other AdaptationSet element, and one component is disposed corresponding thereto. Then, the AdaptationSet element and the Representation element thereunder are mapped to the ElementaryComponent. Further, the relationship represented as "5" of the solid line in FIG. 21 between the ElementaryComponent and the PickOneComponent of the level 1 is represented by the group attribute of the AdaptationSet element.

In other words, in the second embodiment, differently from the first embodiment, since the function of the layer of the level 2 is implemented not by using the contains-attribute of the Subset element, but by using the EssentialProperty element disposed in the AdaptationSet element, it is possible to group the AdaptationSet elements associated by the schemeIdUri attribute and the value attribute of the EssentialProperty element, by the group attribute of the AdaptationSet element.

In other words, in the second embodiment, it is possible to represent the relationship represented as "5" of a dotted line in FIG. 21 between the CompositeComponent of the level 2 and the PickOneComponent of the level 1 by the group attribute of the AdaptationSet element, without performing the expansion of the MPD. Accordingly, since all of the relationship represented as "5" of the dotted line in FIG. 21 between the CompositeComponent of the level 2 and the PickOneComponent of the level 1, the relationship represented as "4" between the PickOneComponent of the level 3 and the PickOneComponent of the level 1, and the relationship represented as "5" of the solid line in FIG. 21 between the ElementaryComponent and PickOneComponent of the level 1 are satisfied, the function of the layer of the level 1 is implemented.

In addition, the example of using the EssentialProperty element as the dependency description attribute has been described above, but without being limited thereto, for example, other dependency description attributes such as the SupplementalProperty element may be used.

(2) Specific Operation Example

The specific operation examples of the second embodiment will be described with reference to FIG. 22 and FIG. 23.

(2-1) Operation Example 4

Figure 22:
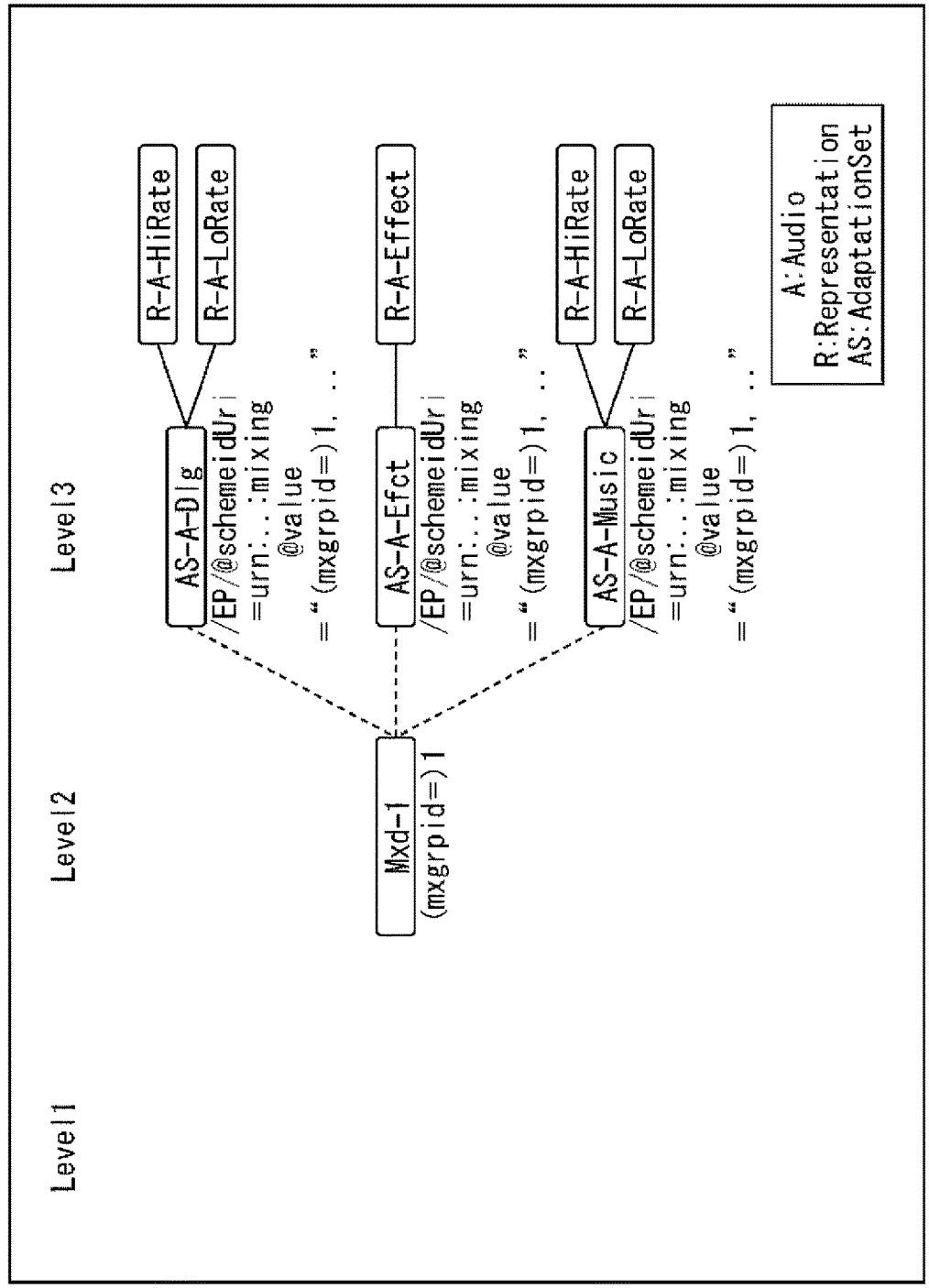
FIG. 22 is a diagram illustrating Operation example 4.

FIG. 22 is a diagram illustrating Operation example 4 of performing mixing playback of an audio stream. In FIG. 22, the contents of the description of the MPD for implementing the Operation example 4 is illustrated, similar to FIG. 14 described above, "AS" and "R" respectively represent the AdaptationSet element, and the Representation element. Further, in FIG. 22, since "EP" means the EssentialProperty element, and "@" means the attribute, "@schemeIdUri" and "@value" represent the schemeIdUri attribute and the value attribute of the EssentialProperty element.

Here, in the Operation example 4 of FIG. 22, "urn:...:mixing" is defined as the attribute value of the schemeIdUri attribute of the EssentialProperty element, and this is defined so as to mean that the AdaptationSet attribute groups of the audio components having the EssentialProperty elements having the attribute value are mixed and output. Further, a value is defined in the value attribute of the EssentialProperty element, in which the value means a value for identifying an audio component group of which the audio components are to be mixed.

In FIG. 22, three AdaptationSet elements corresponding to a single audio stream are described, and one or a plurality of Representation elements are described under the AdaptationSet elements.

Two Representation elements are described under the first AdaptationSet element, Dialogs ((Dlg)) of a high bit rate and a low bit rate are listed as audio components having different bit rates, and one audio component is adaptively selected, for example, depending on the environmental condition of a network and the like, in the layer of the level 3 (PickOneComponent).

Further, 'urn:...:mixing' is designated as the schemeIdUri attribute of the EssentialProperty element and '1' is designated as the value attribute in the first AdaptationSet element. In other words, the component selected in the layer of the level 3 belongs to a mixing group 1 in which group ID (mxgrpid) of "1" is designated.

Only one Representation element is described under the second AdaptationSet element, Effect (Efct) is listed as an audio component, and one audio component is typically selected. The audio component selected in this manner corresponds to the ElementaryComponent.

Further, 'urn:...:mixing' is designated as the schemeIdUri attribute of the EssentialProperty element and '1' is designated as the value attribute in the second AdaptationSet element. In other words, the component corresponding to the ElementaryComponent belongs to a mixing group 1 in which group ID (mxgrpid) of "1" is designated.

Two Representation elements are described under the third AdaptationSet element, two pieces of music of a high bit rate and a low bit rate are listed as audio components having different bit rates, and one audio component is adaptively selected, for example, depending on the environmental condition of a network and the like, in the layer of the level 3 (PickOneComponent).

Further, 'urn:...:mixing' is designated as the schemeIdUri attribute of the EssentialProperty element and '1' is designated as the value attribute in the third AdaptationSet element. In other words, the component selected in the layer of the level 3 belongs to a mixing group 1 in which group ID (mxgrpid) of "1" is designated.

In this manner, the function of the layer of the level 3 in the component layer structure of FIG. 7 is implemented, and the selection of the audio component is performed, by mapping the PickOneComponent to the AdaptationSet element, and mapping the Representation elements listed in the AdaptationSet element to the ElementaryComponent.

Further, since 'urn:...:mixing' is designated as the schemeIdUri attribute of the EssentialProperty element and '1' is designated as the value attribute in the three AdaptationSet elements, the component belongs to the same mixing group 1. In this manner, since a plurality of AdaptationSet elements are grouped by the schemeIdUri attribute and the value attribute of the EssentialProperty element, the function of the layer of the level 2 in the component layer structure of FIG. 7 is implemented, and the mixing of the audio components is performed in the layer of the level 2 (CompositeComponent).

Thus, in the Operation example 4 of FIG. 22, the function of the layer of the level 3 in the component layer structure of FIG. 7 is implemented by mapping the PickOneComponent to the AdaptationSet element, and mapping the Representation elements listed in the AdaptationSet element to the ElementaryComponent. Further, the function of the layer of the level 2 is implemented by performing the association of the plurality of AdaptationSet elements by the schemeIdUri attribute and the value attribute of the EssentialProperty element. Since the functions of the layer of the level 1, the layer of the level 2, and the layer of the level 3 are implemented in this manner, the mixing playback of the audio streams is performed.

(2-2) Operation Example 5

Figure 23:
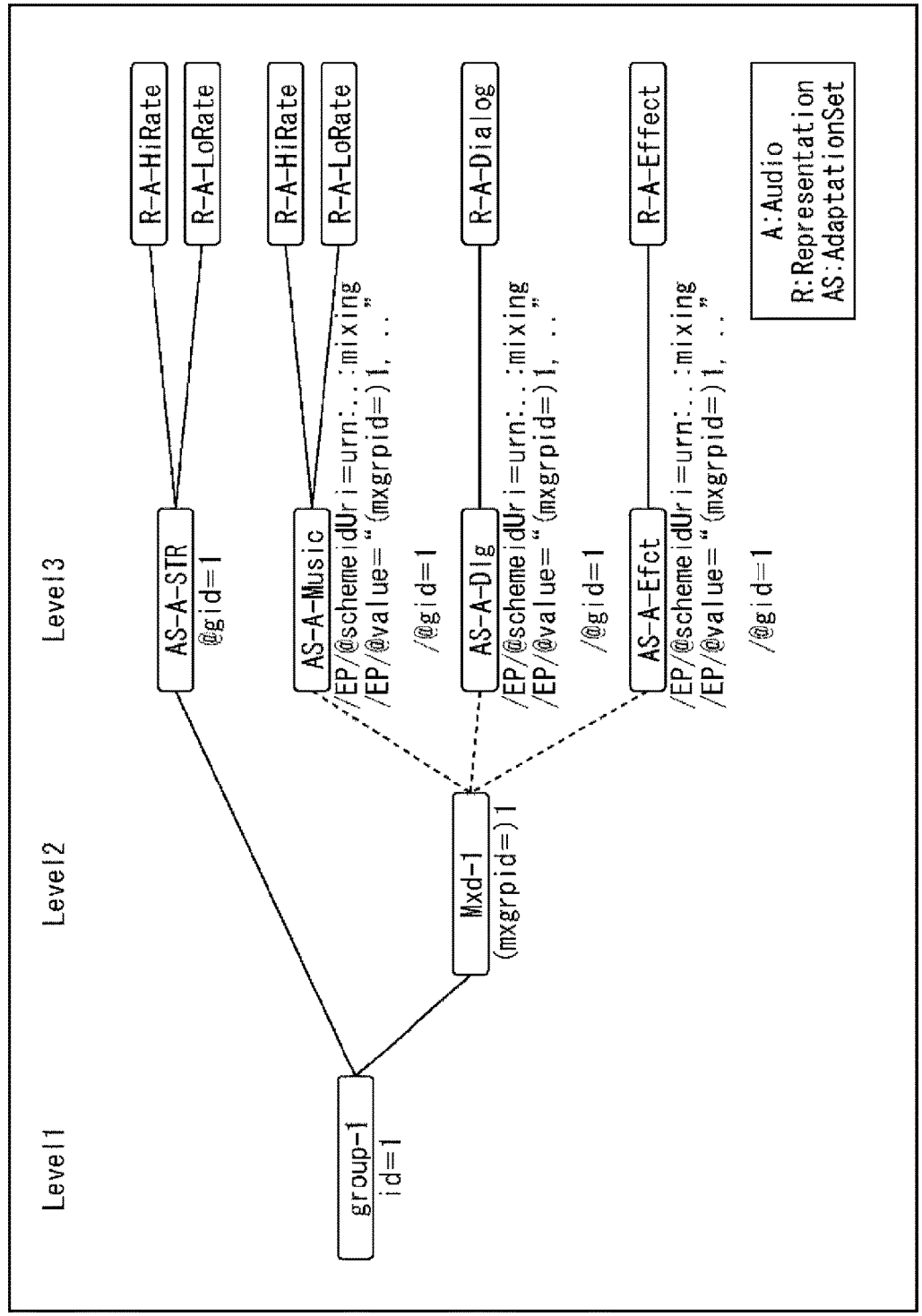
FIG. 23 is a diagram illustrating Operation example 5.

FIG. 23 is a diagram illustrating Operation example 5 of performing group selection of an audio stream.

In FIG. 23, the contents of the description of the MPD for implementing the Operation example 5 is illustrated, similar to FIG. 22, "AS" and "R" respectively represent the AdaptationSet element and the Representation element. Further, a group attribute represented as "@gid" is described in the AdaptationSet element. Further, similar to FIG. 22, "@schemeIdUri" and "@value" represent the schemeIdUri attribute and the value attribute of the EssentialProperty element.

Further, in the Operation example 5 of FIG. 23, similar to the Operation example 4 of FIG. 22, "urn:...:mixing" is defined as the attribute value of the schemeIdUri attribute of the EssentialProperty element, and the AdaptationSet attribute group of the audio component having the EssentialProperty element having the attribute value is defined so as to mean that the audio components are mixed and output. Further, a value is defined in the value attribute of the EssentialProperty element, in which the value means a value for identifying an audio component group of which the audio components are to be mixed.

In FIG. 23, four AdaptationSet elements corresponding to a single audio stream are described, and one or a plurality of Representation elements are described under the AdaptationSet elements.

Two Representation elements are described under the first AdaptationSet element, Stereos (STR) of a high bit rate and a low bit rate are listed as audio components having different bit rates, and one audio component is adaptively selected, for example, depending on the environmental condition of a network and the like, in the layer of the level 3 (PickOneComponent).

Further, group='1' is designated as the group attribute in the first AdaptationSet element. In other words, the component selected in the layer of the level 3 belongs to the group 1.

Two Representation elements are described under the second AdaptationSet element, two pieces of music of a high bit rate and a low bit rate are listed as audio components having different bit rates, and one audio component is adaptively selected, for example, depending on the environmental condition of a network and the like, in the layer of the level 3 (PickOneComponent).

Further, 'urn:...:mixing' is designated as the schemeIdUri attribute of the EssentialProperty element and '1' is designated as the value attribute in the second AdaptationSet element. In other words, the component selected in the layer of the level 3 belongs to a mixing group 1 in which group ID (mxgrpid) of "1" is designated. Further, since group='1' is designated as the group attribute in the second AdaptationSet element, the component selected in the layer of the level 3 also belongs to the group 1 of the level 1.

Only one Representation element is described under the third AdaptationSet element, Dialog ((Dlg)) is listed as an audio component, and one audio component is typically selected. The audio component selected in this manner corresponds to the ElementaryComponent.

Further, 'urn:...:mixing' is designated as the schemeIdUri attribute of the EssentialProperty element and '1' is designated as the value attribute in the third AdaptationSet element. In other words, the component selected in the layer of the level 3 belongs to a mixing group 1 in which group ID (mxgrpid) of "1" is designated. Further, since group='1' is designated as the group attribute in the third AdaptationSet element, the component corresponding to the ElementaryComponent also belongs to the group 1 of the level 1.

Only one Representation element is described under the fourth AdaptationSet element, Effect (Efct) is listed as an audio component, and one audio component is typically selected. The audio component selected in this manner corresponds to the ElementaryComponent.

Further, 'urn:...:mixing' is designated as the schemeIdUri attribute of the EssentialProperty element and '1' is designated as the value attribute in the fourth AdaptationSet element. In other words, the component corresponding to the ElementaryComponent belongs to a mixing group 1 in which group ID (mxgrpid) of "1" is designated. Further, since group='1' is designated as the group attribute in the fourth AdaptationSet element, the component corresponding to the ElementaryComponent also belongs to the group 1 of the level 1.

In this manner, the function of the layer of the level 3 in the component layer structure of FIG. 7 is implemented, and the selection of the audio component is performed, by mapping the PickOneComponent to the AdaptationSet element, and mapping the Representation elements listed in the AdaptationSet element to the ElementaryComponent.

Further, since 'urn:...:mixing' is designated as the schemeIdUri attribute of the EssentialProperty element and '1' is designated as the value attribute in the second to fourth AdaptationSet elements, among the four AdaptationSet elements, the components belong to the same mixing group 1. In this manner, since a plurality of AdaptationSet elements are grouped by the schemeIdUri attribute and the value attribute of the EssentialProperty element, the function of the layer of the level 2 in the component layer structure of FIG. 7 is implemented, and the mixing of the audio components is performed in the layer of the level 2 (CompositeComponent).

Further, since group='1' is designated as the group attribute in all four AdaptationSet elements, the components belong the group of the same level 1. In this manner, since function of the layer of the level 1 in the component layer structure of FIG. 7 is implemented by performing grouping by the group attribute of the AdaptationSet element, one audio component is selected from the audio components in the same group, in the layer of the level 1 (PickOneComponent). Here, any one audio component among the audio component (Stereo) selected in the layer of the level 3 (PickOneComponent) and audio components (Music, Dialog, and Effect) mixed in the layer of the level 2 (CompositeComponent), belonging to the group 1, is selected.

Thus, in the Operation example 5 of FIG. 23, the function of the layer of the level 3 in the component layer structure of FIG. 7 is implemented by mapping the PickOneComponent to the AdaptationSet element, and mapping the Representation elements listed in the AdaptationSet element to the ElementaryComponent. Further, the function of the layer of the level 2 is implemented by performing the association of the plurality of AdaptationSet elements, by the schemeIdUri attribute and the value attribute. Further, the function of the layer of the level 1 is implemented by grouping the plurality of AdaptationSet elements by the group attribute of the AdaptationSet element. Since the functions of the layer of the level 2 and the layer of the level 3 are implemented in this manner, the group selection of the audio component is performed, and the audio component is played.

5. Third Embodiment (1) Example of Other Use of Subset Element

In the first embodiment, the example in which Subset elements are used in the MPD in order to satisfy the function of the layer of the level 2 in the component layer structure of FIG. 7 has been described, but the Subset elements may be used in order to define a grouping for the simultaneous presentation of a plurality of components such as a video and audio, in a range out of the provision regarding the component layer structure. Hereinafter, other examples of use of Subset elements will be described with reference to specific operation examples.

(2) Operation Example 6

Figure 24:
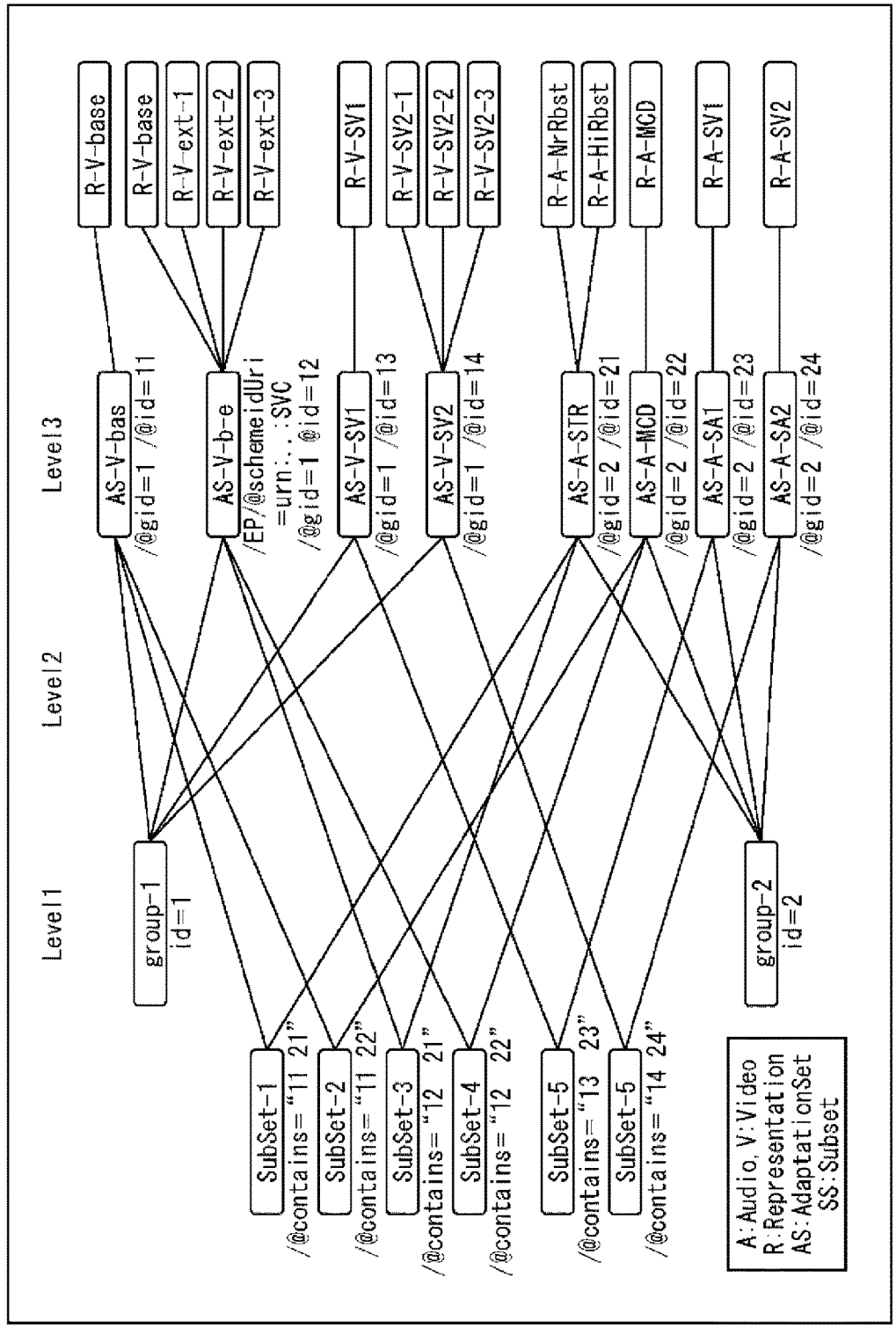
FIG. 24 is a diagram illustrating Operation example 6.

FIG. 24 is a diagram illustrating Operation example 6 of performing grouping for the simultaneous presentation of components. In FIG. 24, the contents of the description of the MPD for implementing the Operation example 6 is illustrated, "AS" and "R" respectively represent the AdaptationSet element and the Representation element. Further, an id attribute represented as "@id" and a group attribute represented as "@gid" are described in the AdaptationSet element. Further, "@schemeIdUri" represents the schemeIdUri attribute of the EssentialProperty element.

In the MPD of FIG. 24, four AdaptationSet elements (id='11', '12', '13', and '14') belonging to a group 1 of a video and four AdaptationSet elements (id='21', '22', '23', and '24') belonging to a group 2 of audio are described, and one or a plurality of Representation elements are respectively described under the AdaptationSet elements.

In the group 1 of the video, "base", "ext", "SV1", and "SV2" are listed as video components in respective Representation elements. Here, "base" represents a video component corresponding to a basic video signal that can be played alone, and "ext" represents a video component corresponding to a video signal for expansion. Further, in "SV1" and "SV2", "SV" represents a subview which is an auxiliary area of a main view which is a main display area.

Under the AdaptationSet element of id='11', only one Representation element is described, and one video component corresponding to the basic video signal that can be played alone is typically selected. The video component selected in this way corresponds to the ElementaryComponent. In addition, the video component is for the main view.

"urn:...:SVC" is designated as the attribute value of the schemeIdUri attribute of the EssentialProperty element in the AdaptationSet element of id='12'. Here, in the Operation example 6 in FIG. 24, "urn:...:SVC" is defined as the attribute value of the schemeIdUri attribute of the EssentialProperty element, and the AdaptationSet attribute having the EssentialProperty element having the attribute value is defined so as to mean that the Representation element group thereunder has dependency of a Base-Enhance relationship.

Accordingly, four Representation elements under the AdaptationSet element of id='12' have dependency of a Base-Enhance relationship. In other words, under the AdaptationSet element of id='12', four Representation elements are described in which one video component corresponding to the basic video signal and three video components corresponding to the video signals for expansion are listed, and the four Representation elements have dependency of a Base-Enhance relationship. Accordingly, the video components corresponding to the basic video signal and the video signal for expansion are selected, for example, depending on the environmental condition of a network and the like, in the layer of the level 3 (PickOneComponent). In addition, the video component is for the main view.

In this manner, in the second embodiment, the example in which EssentialProperty elements are used in the MPD in order to satisfy the function of the layer of the level 2 in the component layer structure of FIG. 7 has been described, but the EssentialProperty elements may be used in order to represent the characteristics of the component groups listed in the Representation elements under the AdaptationSet attribute.

Under the AdaptationSet element of id='13', only one Representation element is described, and one video component for a subview 1 is typically selected. The video component selected in this way corresponds to the ElementaryComponent.

Under the AdaptationSet element of id='14', three Representation elements are described, three video components for a subview 2 are listed, and one video component is adaptively selected, for example, depending on the environmental condition of a network and the like, in the layer of the level 3 (PickOneComponent).

In this manner, the function of the layer of the level 3 in the component layer structure of FIG. 7 is implemented, and the selection of the video component is performed, by mapping the PickOneComponent to the AdaptationSet element, and mapping the Representation elements listed in the AdaptationSet element to the ElementaryComponent.

Here, in the MPD of FIG. 24, group='1' is designated in the AdaptationSet element of id='11', the AdaptationSet element of id='12', the AdaptationSet element of id='13', and the AdaptationSet element of id='14', and the AdaptationSet elements belong to the same group 1.

In this manner, the function of the layer of the level 1 in the component layer structure of FIG. 7 is implemented by performing grouping by the group attributes, and one video component is selected from video components in the same group, in the layer of the level 1 (PickOneComponent). Here, one video component is selected from the video component that belongs to the group 1 and is selected in the layer of the level 3 (PickOneComponent) and the ElementaryComponent.

Meanwhile, in a group 2 of audio, "NrRbst", "HiRbst", "MCD", "SV1", and "SV2" are listed as audio components in respective Representation elements. "NrRbst" means an audio component having normal robustness. Further, "HiRbst" means an audio component having high robustness. "MCD" represents a multi-channel audio component. Further, in "SV1" and "SV2", "SV" represents an audio component for subview.

Under the AdaptationSet element of id='21', two Representation elements are described, an audio component having normal robustness and an audio component having high robustness are listed, and one audio component is adaptively selected, for example, depending on the environmental condition of a network and the like, in the layer of the level 3 (PickOneComponent). In addition, the audio component is for the main view.

Under the AdaptationSet element of id='22', only one Representation element is described, and one multi-channel audio component is typically selected. The audio component selected in this way corresponds to the ElementaryComponent. In addition, the audio component is for the main view.

Under the AdaptationSet element of id='23', only one Representation element is described, and one audio component for subview 1 is typically selected. Similarly, under the AdaptationSet element of id='24', one audio component for subview 2 is typically selected. The audio components for subview selected in this way correspond to the ElementaryComponent.

Here, in the MPD of FIG. 24, group='2' is designated as the group attribute in the AdaptationSet element of id='21', the AdaptationSet element of id='22', the AdaptationSet element of id='23', and the AdaptationSet element of id='24', and the AdaptationSet elements belong to the same group 2.

In this manner, the function of the layer of the level 1 in the component layer structure of FIG. 7 is implemented by performing grouping by the group attributes, and one audio component is selected from audio components in the same group, in the layer of the level 1 (PickOneComponent). Here, one audio component is selected from the audio component that belongs to the group 2 and is selected in the layer of the level 3 (PickOneComponent) and the ElementaryComponent.

Further, in the MPD of FIG. 24, the Subset elements are used in order to define a grouping for the simultaneous presentation of a plurality of components such as a video and audio, in a range out of the provision regarding the component layer structure.

Specifically, '11 21' is designated in the contains-attribute of the first Subset element, and this indicates that the AdaptationSet element of id='11' and the AdaptationSet element of id='21' are a pair of the AdaptationSet elements to be simultaneously presented. In other words, a video component ("V-base") and an audio component ("A-NrRbst" or "A-HiRbst") are components for a main view to be simultaneously played.

Further, '11 22' is designated in the contains-attribute of the second Subset element, and this indicates that the AdaptationSet element of id='11' and the AdaptationSet element of id='22' are a pair of the AdaptationSet elements to be simultaneously presented. In other words, a video component ("V-base") and an audio component ("A-MCD") are components for a main view to be simultaneously played.

Further, '12 21' is designated in the contains-attribute of the third Subset element, and this indicates that the AdaptationSet element of id='12' and the AdaptationSet element of id='21' are a pair of the AdaptationSet elements to be simultaneously presented. In other words, video components ("V-base" and "V-ext") and an audio component ("A-NrRbst" or "A-HiRbst") are components for a main view to be simultaneously played.

Further, '12 22' is designated in the contains-attribute of the fourth Subset element, and this indicates that the AdaptationSet element of id='12' and the AdaptationSet element of id='22' are a pair of the AdaptationSet elements to be simultaneously presented. In other words, video components ("V-base" and "V-ext") and an audio component ("A-MCD") are components for a main view to be simultaneously played.

Further, '13 23' is designated in the contains-attribute of the fifth Subset element, and this indicates that the AdaptationSet element of id='13' and the AdaptationSet element of id='23' are a pair of the AdaptationSet elements to be simultaneously presented. In other words, a video component ("V-SV1") and an audio component ("A-SV1") are components for a subview 1 to be simultaneously played.

Further, '14 24' is designated in the contains-attribute of the sixth Subset element, and this indicates that the AdaptationSet element of id='14' and the AdaptationSet element of id='24' are a pair of the AdaptationSet elements to be simultaneously presented. In other words, a video component ("V-SV2") and an audio component ("A-SV2") are components for a subview 2 to be simultaneously played.

Hitherto, in the Operation example 6 of FIG. 24, since the Subset elements are used in order to define a grouping for the simultaneous presentation of a plurality of components such as a video and audio, in a range out of the provision regarding the component layer structure of FIG. 7, it is possible to associate a video and audio with a video and audio for a main view, a subview 1, or, a subview 2. Further, for example, if one component between a video component and an audio component is identified, other component is also identified.

6. System Configuration (Configuration Example of Broadcast Communication System)

Figure 25:
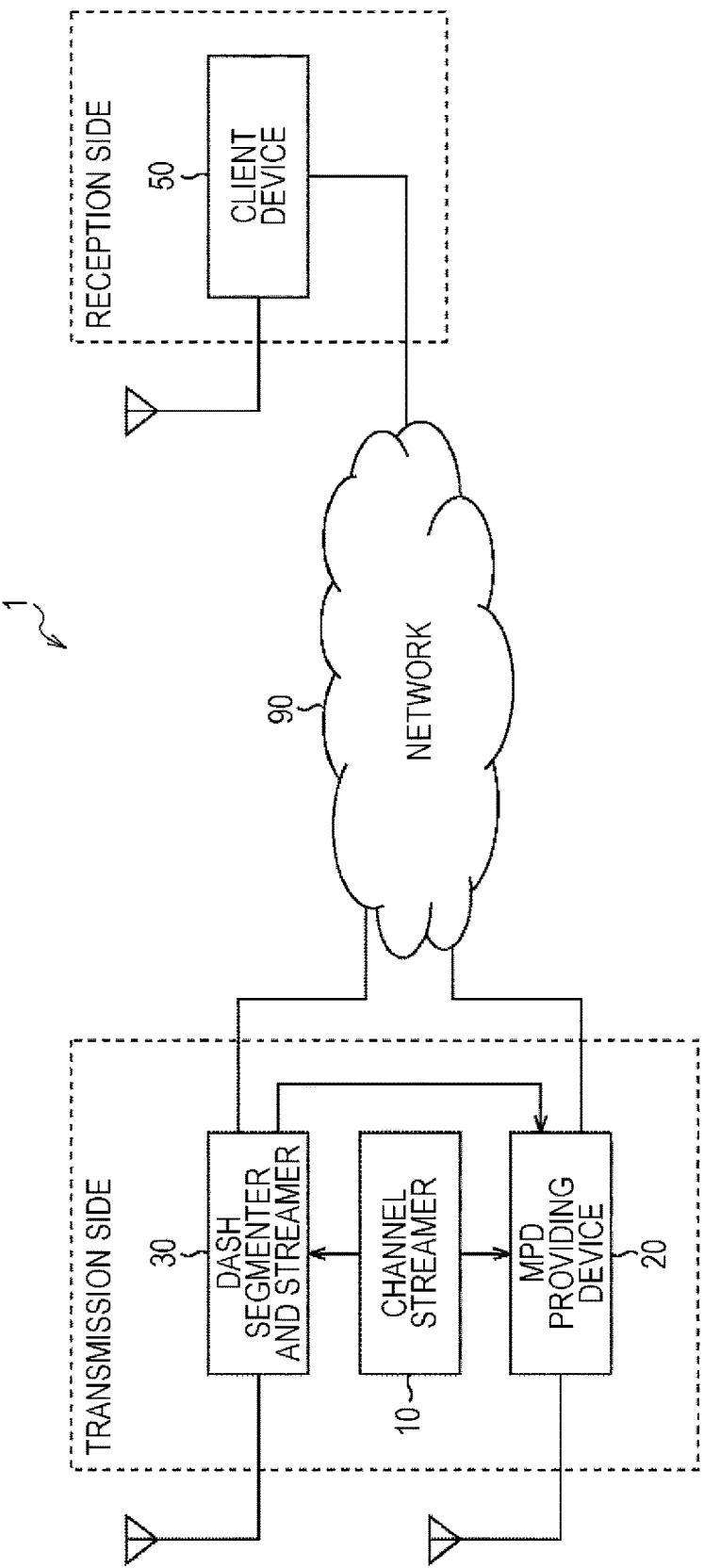
FIG. 25 is a diagram illustrating a configuration example of a broadcast communication system.

FIG. 25 is a diagram illustrating a configuration example of a broadcast communication system employing the present technology.

As illustrated in FIG. 25, the broadcast communication system 1 is configured with a channel streamer 10, an MPD providing device 20, a DASH segmenter and streamer 30, and a client device 50. Further, the client device 50 is connected to the MPD providing device 20 and the DASH segmenter and streamer 30 with each other through a network 90 such as the Internet.

The channel streamer 10 supplies metadata of content including various types of components such as a video, audio, and subtitles, to the MPD providing device 20. Further, the channel streamer 10 supplies stream data of content including various types of components such as a video, audio, and subtitles, to the DASH segmenter and streamer 30.

Here, for example, in a service that provides the content, the video component and the audio component having different bit rates such as 1 Mbps, 5 Mbps, 10 Mbps, and 20 Mbps are prepared in order to implement the adaptive streaming delivery, as components constituting the content. The channel streamer 10 provides the components as the stream data, to the DASH segmenter and streamer 30.

The MPD providing device 20 generates an MPD based on the metadata of content provided from the channel streamer 10 and segment metadata provided from the DASH segmenter and streamer 30. The generated MPD is transmitted by using broadcasting or communication.

In other words, when the MPD providing device 20 transmits the MPD in a digital broadcast signal, for example, the MPD file is periodically multicast in a file delivery over unidirectional transport (FLUTE) session. Further, when the MPD providing device 20 transmits the MPD through a communication network, the MPD file is unicast to the client device 50 through the network 90, in response to, for example, a request for the MPD from the client device 50.

The DASH segmenter and streamer 30 generates segment data based on the stream data of content provided from the channel streamer 10. The generated segment data is transmitted by using broadcasting or communication.

In other words, when the DASH segmenter and streamer 30 transmits the segment data in a digital broadcast signal, for example, the segment data is periodically multicast in the FLUTE session. Further, when the DASH segmenter and streamer 30 transmits the segment data through a communication network, the segment data is unicast to the client device 50 through the network 90, in response to, for example, a request for the segment data from the client device 50.

The client device 50 receives the MPD file that is multicast or unicast by the MPD providing device 20. Further, the client device 50 selects a best component among a plurality of component candidates constituting content, based on the MPD file. The client device 50 receives the segment data that is multicast or unicast by the DASH segmenter and streamer 30, based on the result of selection of the component. Then, the client device 50 plays the content by restoring the stream data of content from the received segment data.

The broadcast communication system 1 is configured as described above. Next, the detailed configuration of each device constituting the broadcast communication system 1 of FIG. 25 will be described.

(Configuration Example of Device on Transmission Side)

Figure 26:
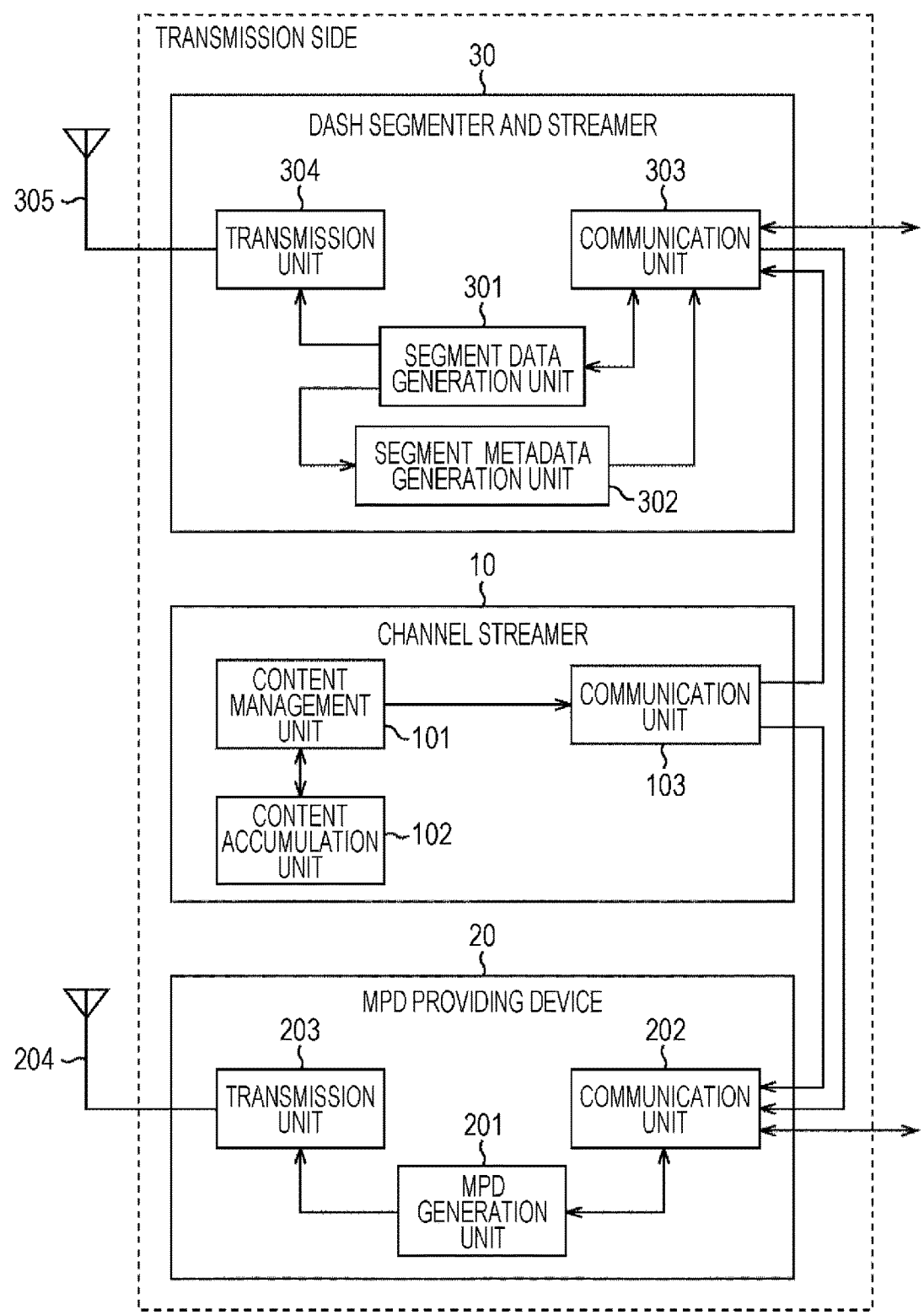
FIG. 26 is a diagram illustrating a configuration example of an apparatus on a transmission side.

FIG. 26 is a diagram illustrating a configuration example of a device on a transmission side.

As illustrated in FIG. 26, the device on the transmission side is configured with a channel streamer 10, an MPD providing device 20, and a DASH segmenter and streamer 30.

The channel streamer 10 is configured with a content management unit 101, a content accumulation unit 102, and a communication unit 103. The content management unit 101 manages the content accumulated in the content accumulation unit 102.

The communication unit 103 supplies the metadata of content accumulated in the content accumulation unit 102 to the MPD providing device 20, in response to control from the content management unit 101. Further, the communication unit 103 supplies the stream data of content accumulated in the content accumulation unit 102 to the DASH segmenter and streamer 30, in response to control from the content management unit 101.

The MPD providing device 20 is configured with an MPD generation unit 201, a communication unit 202, and a transmission unit 203.

The communication unit 202 receives the metadata of content provided from the channel streamer 10 and the segment metadata provided from the DASH segmenter and streamer 30, and supplies them to the MPD generation unit 201. The MPD generation unit 201 generates an MPD file, based on the metadata of content and the segment metadata supplied from the communication unit 202, and supplies the MPD file to the communication unit 202 or the transmission unit 203.

The communication unit 202 transmits the MPD file supplied from the MPD generation unit 201, to the client device 50 through the network 90, in response to the request of the MPD from the client device 50. Further, the transmission unit 203 modulates the MPD file supplied from the MPD generation unit 201, and supplies a digital broadcast signal through an antenna 204. In addition, at this time, the MPD file is transmitted in, for example, the FLUTE session.

The DASH segmenter and streamer 30 is configured with a segment data generation unit 301, a segment metadata generation unit 302, a communication unit 303, and a transmission unit 304.

The communication unit 303 receives the stream data of content provided from the channel streamer 10, and supplies the stream data of content to the segment data generation unit 301. The segment data generation unit 301 generates segment data, based on the stream data of content supplied from the communication unit 303, and supplies the segment data to the communication unit 303 or the transmission unit 304.

The communication unit 303 transmits the segment data supplied from the segment data generation unit 301, to the client device 50 through the network 90, in response to the request for the segment data from the client device 50. Further, the transmission unit 304 modulates the segment data supplied from the segment data generation unit 301, and transmits a digital broadcast signal through an antenna 305. In addition, at this time, the segment data is transmitted in, for example, a FLUTE session.

Further, the segment data generation unit 301 supplies the generated segment data to the segment metadata generation unit 302. The segment metadata generation unit 302 generates segment metadata, based on the segment data supplied from the segment data generation unit 301, and supplies the segment data to the communication unit 303. The communication unit 303 supplies the segment metadata supplied from the segment metadata generation unit 302 to the MPD providing device 20.

In addition, in FIG. 25 and FIG. 26, for the convenience of explanation, the channel streamer 10, the MPD providing device 20, and the DASH segmenter and streamer 30 on the transmission side are described as individual devices, but the devices on the transmission side may have a functional configuration illustrated in FIG. 26, for example, the channel streamer 10, the MPD providing device 20, and the DASH segmenter and streamer 30 can be regarded as a single device. At this time, for example, duplicated functions such as the communication unit and the transmission unit can be combined into one.

(Configuration Example of Device on Reception Side)

Figure 27:
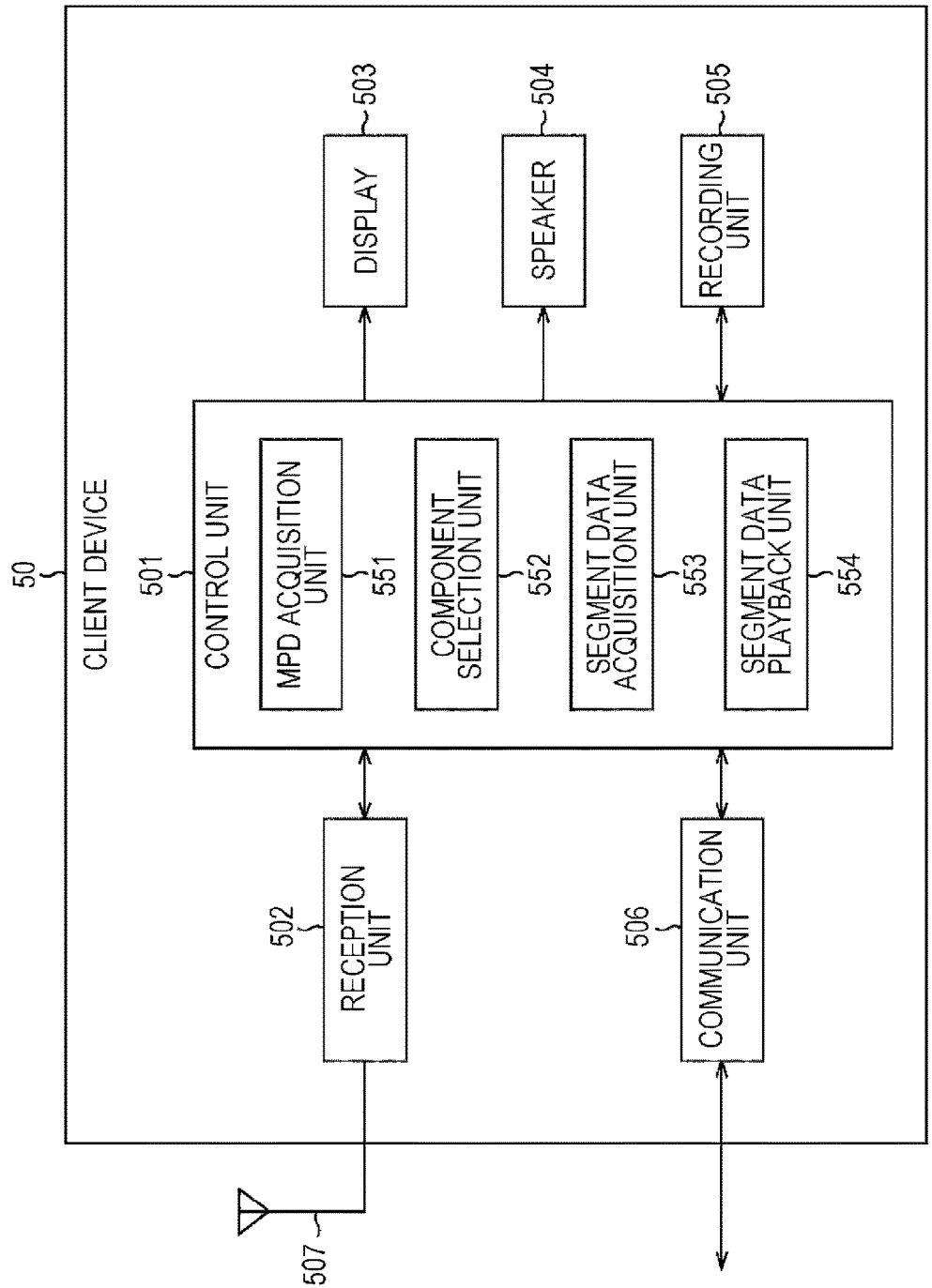
FIG. 27 is a diagram illustrating a configuration example of an apparatus on a reception side.

FIG. 27 is a diagram illustrating a configuration example of a client device on a reception side.

As illustrated in FIG. 27, the client device 50 is configured with a control unit 501, a reception unit 502, a display 503, a speaker 504, a recording unit 505, and a communication unit 506.

The control unit 501 controls the operation of each unit of the client device 50.

The reception unit 502 receives the digital broadcast signal transmitted from the device on the transmission side through an antenna 507, in response to control from the control unit 501. The reception unit 502 demodulates the digital broadcast signal, and supplies the obtained data to the control unit 501. The control unit 501 performs various process on the data supplied from the reception unit 502.

The display 503 displays an image according to the stream data of content in response to control from the control unit 501. The speaker 504 outputs audio according to the stream data of content in response to control from the control unit 501.

The recording unit 505 is configured with, for example, a hard disk, and records the stream data of content in response to the control of the control unit 501. The communication unit 506 exchanges various types of data with the device on the transmission side through the network 90, in response to the control of the control unit 501.

The control unit 501 is configured with an MPD acquisition unit 551, a component selection unit 552, a segment data acquisition unit 553, and a segment data playback unit 554.

The MPD acquisition unit 551 controls the reception unit 502 or the communication unit 506 so as to acquire the MPD file transmitted in broadcasting or communication, and supplies the MPD file to the component selection unit 552. The component selection unit 552 selects a best component among a plurality of component candidates, based on the MPD file supplied from the MPD acquisition unit 551, and supplies the result of the selection to the segment data acquisition unit 553.

The segment data acquisition unit 553 controls the reception unit 502 or the communication unit 506, based on the result of the selection from the component selection unit 552 so as to acquire the segment data transmitted in broadcasting or communication, and supplies the segment data to the segment data playback unit 554. The segment data playback unit 554 supplies the video stream data and the audio stream data which are obtained from the segment data from the segment data acquisition unit 553 to the display 503 and the speaker 504, respectively. Thus, an image of content is displayed on the display 503, and audio synchronized with the video is output from the speaker 504.

In addition, the configuration of the client device 50 of FIG. 27 includes the display 503 and the speaker 504, but without being included in the client device 50, the display 503 and the speaker 504 may be configured separate units, or may be incorporated into a television receiver, a video recorder, or the like.

7. Flow of Specific Process of Each Apparatus

As described above, the device on the transmission side may unicast the MPD file and the segment data in response to the request from the client device 50 on the reception side, or regardless of the request from the client device 50 on the reception side, may periodically multicast them. Thus, hereinafter, cases of multicast and unicast the MPD file and the segment data will be respectively described.

<Flow of Process During Multicast Delivery>

First, the flow of a specific process in each device during the multicast delivery will be described with reference to the flowchart of FIG. 28. In addition, in FIG. 28, the flows of the processes of the channel streamer 10, the MPD providing device 20, and the DASH segmenter and streamer 30 as devices on a transmission side are illustrated, and the flow of the process of the client device 50 as a device on a reception side is illustrated.

The channel streamer 10 performs the process of steps S101 to S102. Specifically, in step S101, the content management unit 101 acquires metadata of content from the content accumulation unit 102, and supplies the metadata to the MPD providing device 20 through the communication unit 103. Further, in step S102, the content management unit 101 acquires stream data of content from the content accumulation unit 102, and supplies the stream data to the DASH segmenter and streamer 30 through the communication unit 103.

The MPD providing device 20 performs the process of steps S201 to S202. Specifically, the MPD providing device 20 acquires the metadata of content provided from the channel streamer 10, and segment metadata provided from the DASH segmenter and streamer 30 (steps S101, and S303). In step S201, the MPD generation unit 201 generates an MPD based on the metadata of content and the segment metadata.

In step S202, the transmission unit 203 transmits a digital broadcast signal corresponding to the MPD generated in the process of step S201 through the antenna 204. Here, the MPD file is periodically multicast in a FLUTE session.

The DASH segmenter and streamer 30 performs the process of steps S301 to S304. Specifically, the DASH segmenter and streamer 30 acquires stream data of content provided from the channel streamer 10 (step S102). In step S301, the segment data generation unit 301 generates segment data, based on the stream data of content. Further, in step S302, the segment metadata generation unit 302 generates segment data, based on the segment data generated in the process of step S301.

In step S303, the communication unit 303 supplies the segment metadata generated in the process of step S302 to the MPD providing device 20. Further, in step S304, the transmission unit 304 transmits a digital broadcast signal corresponding to the segment data generated in the process of step S301 through the antenna 305. Here, the segment data is periodically multicast in a FLUTE session.

The client device 50 performs the process of steps S501 to S504. Specifically, in step S501, the reception unit 502 receives the digital broadcast signal corresponding to the MPD which is multicast from the MPD providing device 20 through the antenna 507. Here, the MPD acquisition unit 501 acquires the MPD file which is obtained by demodulating the digital broadcast signal and transmitted in the FLUTE session.

In step S502, the component selection unit 552 selects the best component among a plurality of component candidates, based on the MPD acquired in the process of step S501. Here, the component has the component layer structure of FIG. 7, but as described in the first to third embodiments, the functions of the layers of the level 1 to the level 3 are implemented according to the contents of the description of the MPD file, and the best component is selected.

In step S503, the reception unit 502 receives the digital broadcast signal corresponding to the segment data which is multicast from the DASH segmenter and streamer 30 through the antenna 507. Here, the segment data acquisition unit 553 acquires the segment data which is multicast from the DASH segmenter and streamer 30, and transmitted in the FLUTE session, based on the result of the selection process of step s502.

In step S504, the segment data playback unit 554 restores the stream data of content from the segment data which is acquired in the process of step s503, and supplies the video stream data and the audio stream data to the display 503 and the speaker 504, respectively. Thus, an image of content is displayed on the display 503, and audio synchronized with the video is output from the speaker 504.

Hitherto, the flow of a specific process in each device during the multicast delivery has been described.

<Flow of Process During Unicast Delivery>

Next, the flow of a specific process in each device during the unicast delivery will be described with reference to the flowchart of FIG. 29. In addition, in FIG. 29, similar to FIG. 28, the flows of the processes of the channel streamer 10, the MPD providing device 20, and the DASH segmenter and streamer 30 as devices on a transmission side are illustrated, and the flow of the process of the client device 50 as a device on a reception side is illustrated.

Figure 28:
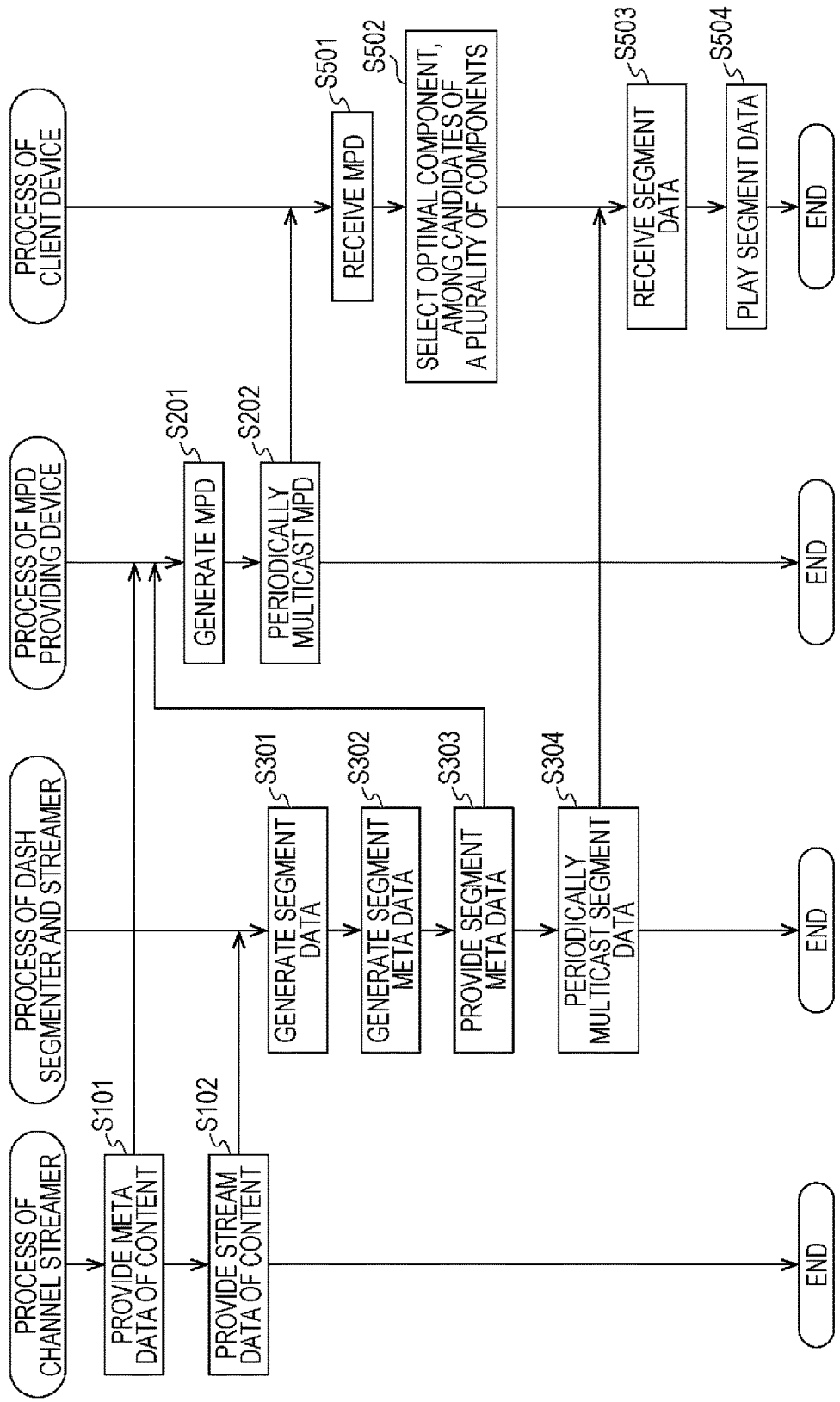
FIG. 28 is a flowchart illustrating a flow of a specific process of each device during multicast delivery.
Figure 29:
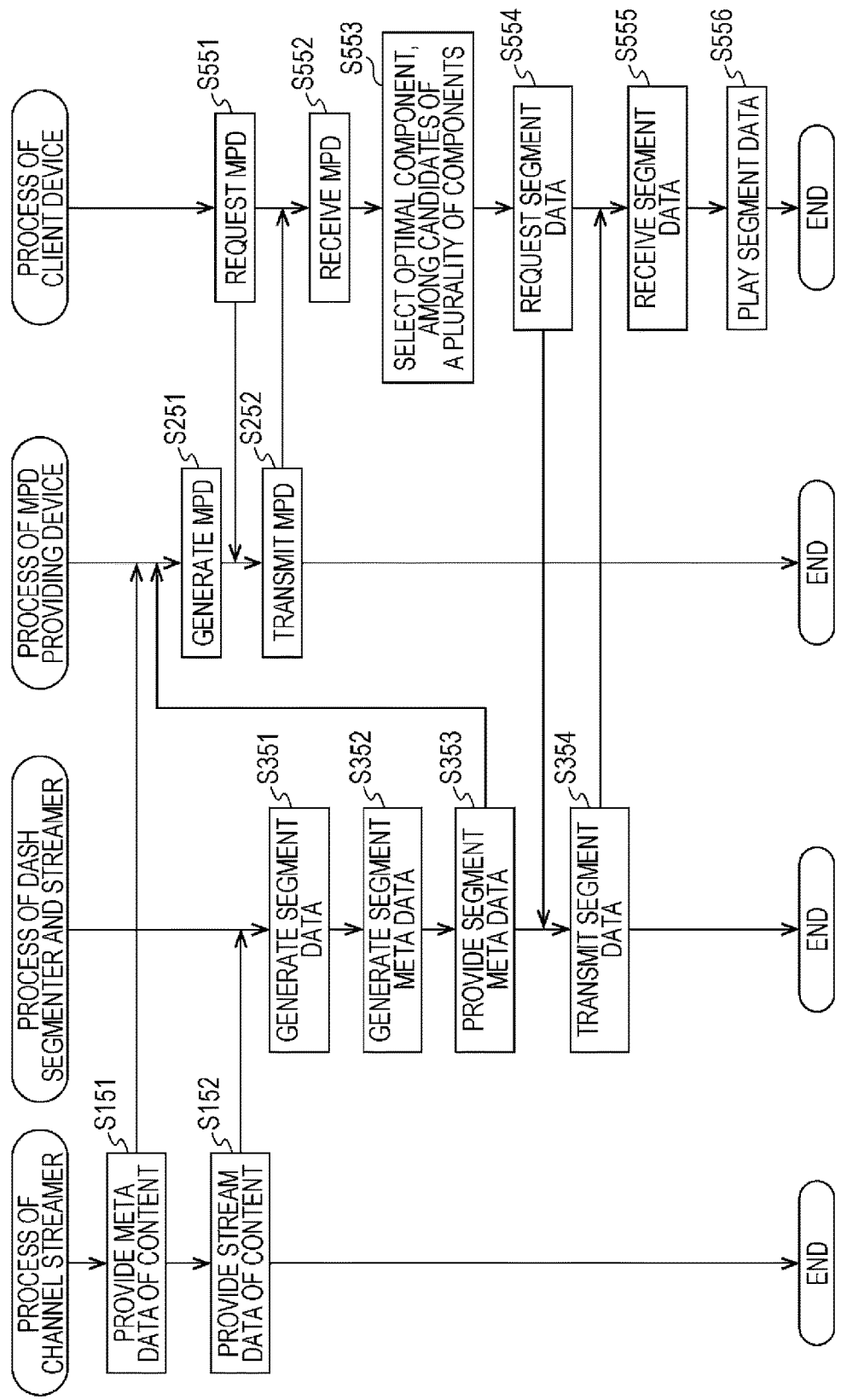
FIG. 29 is a flowchart illustrating a flow of a specific process of each device during unicast delivery.

The details of the process of steps S151 to S152 which are performed by the channel streamer 10 are the same as the process of steps S101 to S102 of FIG. 28. In other words, in steps S151 to S152, the metadata of content is supplied to the MPD providing device 20 and the stream data of content is supplied to the DASH segmenter and streamer 30.

The MPD providing device 20 performs the process of steps S251 and S252. Specifically, the MPD providing device 20 acquires the metadata of content provided from the channel streamer 10 and the segment metadata provided from the DASH segmenter and streamer 30 (steps S151, and S353). In step S251, the MPD generation unit 201 generates the MPD file, based on the metadata of content and the segment metadata.

In step S252, when receiving a request for the MPD from the client device 50, the communication unit 202 transmits the MPD file generated in step S251 to the client device 50 through the network 90, in response to the request for the MPD.

The DASH segmenter and streamer 30 performs the process of steps S351 to S354. Specifically, the DASH segmenter and streamer 30 acquires the stream data of content provided from the channel streamer 10 (step S152). In step S351, the segment data generation unit 301 generates segment data, based on the stream data of content. Further, in step S352, the segment metadata generation unit 302 generates segment metadata, based on the segment data generated in the process of step S351.

In step S353, the communication unit 303 provides the segment metadata generated in the process of step S352 to the MPD providing device 20. Further, in step S354, when receiving a request for the segment data from the client device 50, the communication unit 303 transmits the segment data generated in the process of step S351 to the client device 50 through the network 90, in response to the request for the segment data.

The client device 50 performs the process of steps S551 to S556. Specifically, in step S551, the communication unit 506 accesses the MPD providing device 20 through the network 90, in response to control from the MPD acquisition unit 551 so as to make a request for the MPD. In step S552, the communication unit 506 receives the MPD file that is unicast from the MPD providing device 20 through the network 90, in response to control from the MPD acquisition unit 551.

In step S553, the component selection unit 552 selects a best component among a plurality of component candidates, based on the MPD file acquired in the process of step S552. Here, although the component has the component layer structure in FIG. 7, as described in the first to third embodiments, the functions of the level 1 to the level 3 are implemented according to the contents of the description of the MPD file, such that a best component is selected.

In step S554, the communication unit 506 accesses the DASH segmenter and streamer 30 through the network 90, in response to control from the segment data acquisition unit 553 so as to make a request for the segment data. In step S555, the communication unit 506 receives the segment data that is unicast from the DASH segmenter and streamer 30 through the network 90, in response to control from the segment data acquisition unit 553.

In step S556, the segment data playback unit 554 restores the stream data of content from the segment data which is acquired in the process of step S555, and supplies the video stream data and the audio stream data to the display 503 and the speaker 504, respectively. Thus, an image of content is displayed on the display 503, and audio synchronized with the video is output from the speaker 504.

Hitherto, the flow of a specific process in each device during the unicast delivery has been described.

8. Configuration of Computer

Figure 30:
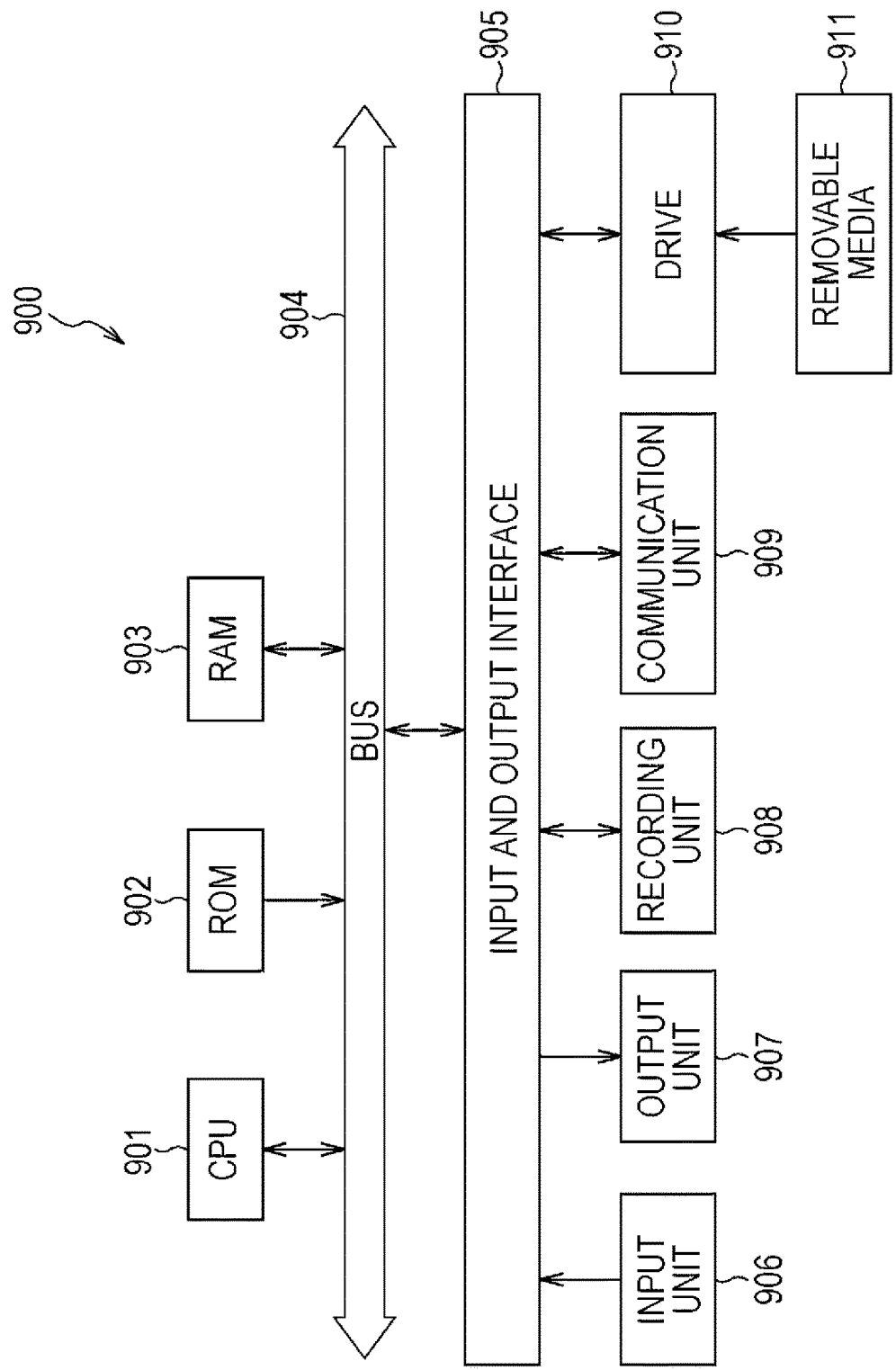
FIG. 30 is a diagram illustrating a configuration example of a computer.

The series of processes described above can be performed by hardware, or software. When the series of processes are performed by software, programs constituting the software are installed in a computer. FIG. 30 is a diagram illustrating a configuration example of hardware of a computer that executes the series of processes described above.

In a computer 900, a central processing unit (CPU) 901, a read only memory (ROM) 902, and a random access memory (RAM) 903 are connected to each other through a bus 904. Further, an input and output interface 905 is connected to the bus 904. An input unit 906, an output unit 907, a recording unit 908, a communication unit 909, and a drive 910 are connected to the input and output interface 905.

The input unit 906 includes a keyboard, a mouse, a microphone, and the like. The output unit 907 includes a display, a speaker, and the like. The recording unit 908 includes a hard disk, a nonvolatile memory, and the like. The communication unit 909 includes a network interface, and the like. The drive 910 drives a removable media 911 such as a magnetic disk, an optical disk, a magneto-optical disk, and a semiconductor memory.

In the computer 900 configured as described above, a series of processes described above is performed by the CPU 901 loading a program stored in the ROM 902 or the recording unit 908 on the RAM 903 and executing the program, through the input and output interface 905 and the bus 904.

The program that the computer 900 (CPU 901) executes can be provided by being recorded, for example, on the removable media 911 as package media or the like. Further, the program can be provided through a wired or wireless transmission medium such as a local area network, the Internet, and digital satellite broadcasting.

In the computer 900, the program can be installed in the recording unit 908, by mounting the removable media 911 in the drive 910 through the input and output interface 905. Further, the program can be received by the communication unit 909 and installed in the recording unit 908, through a wired or wireless transmission medium. Alternatively, the program can be installed in advance in the ROM 902 or the recording unit 908.

Here, in this specification, the processes that the computer performs according to the program may not to be performed chronologically in the order described in the flowcharts. In other words, the processes that the computer performs according to the program include processes performed in parallel or individually (for example, a process by a parallel process or an object). Further, the program may be processed by a single computer (processor), or may be processed in a distributed manner by a plurality of computers.

In addition, the embodiments of the present technology are not limited to the embodiments described above, and various modifications are possible in a scope without departing from the spirit of the present technology.

In addition, the present technology can have the following configurations.

(1)
A reception apparatus including
circuitry configured to
receive a digital broadcast signal; and
based on a media presentation description (MPD), which conforms to the moving picture expert group-dynamic adaptive streaming over HTTP (MPEG-DASH) standard and is transmitted in the digital broadcast signal or via a communication network,
perform at least one of selection or grouping of components according to a level of a component hierarchy associated with the components, and
control playback of content of at least one of the components.

(2)
The reception apparatus according to (1),
wherein the component hierarchy includes a first level, a second level, and a third level,
wherein the third level is for adaptively selecting one of the components,
wherein the second level is for grouping the component that is selected in the third level and components that are not a target of the third level into one group component, and
wherein the first level is for selecting one of the group component grouped in the second level, the component selected in the third level, and the components that are not targets of the second level and the third level.

(3)
The reception apparatus according to (2),
wherein a function of the third level is implemented by mapping the third level to an AdaptationSet element of the MPD, and mapping Representation elements or SubRepresentation elements listed in the AdaptationSet element to the components that are not the target of the third level,
wherein a function of the second level is implemented by a pair of AdaptationSet elements being designated by a first element disposed at the same level as that of the AdaptationSet element defined in the MPD, and
wherein a function of the first level is implemented by performing grouping by a group attribute of the AdaptationSet element and a group attribute defined in the first element.

(4)
The reception apparatus according to (3),
wherein the first element is a Subset element, and
wherein a set of AdaptationSet elements is designated by a contains-attribute of the Subset element.

(5)
The reception apparatus according to (3) or (4),
wherein grouping is performed for each category of the component, in the first level.

(6)
The reception apparatus according to (2),
wherein a function of the third level is implemented by mapping the third level to the AdaptationSet element of the MPD, and mapping Representation elements or SubRepresentation elements listed in the AdaptationSet element to the components that are not the target of the third level, wherein a function of the second level is implemented by grouping a plurality of AdaptationSet elements by a second element that defines a relationship between the AdaptationSet elements of the MPD, a relationship between the Representation elements, or a relationship between the SubRepresentation elements, and wherein a function of the first level is implemented by performing grouping by a group attribute of the AdaptationSet element.

(7)

The reception apparatus according to (6), wherein the second element is an EssentialProperty element, and wherein a set of AdaptationSet elements is designated by a schemeIdUri attribute and a value attribute of the EssentialProperty element.

(8)

The reception apparatus according to (6) or (7), wherein grouping is performed for each category of the component, in the first level.

(9)

The reception apparatus according to any one of (1) to (8), wherein the at least one of the components is transmitted in the digital broadcast signal or via the communication network.

(10)

A reception method of a reception apparatus, the method c including receiving a digital broadcast signal; and based on a media presentation description (MPD), which conforms to the moving picture expert group-dynamic adaptive streaming over HTTP (MPEG-DASH) standard and is transmitted in the digital broadcast signal or via a communication network, performing, by circuitry of the reception apparatus, at least one of selection or grouping of components according to a level of a component hierarchy associated with the components; and controlling, by the circuitry, playback of content of at least one of the components.

(11)

A transmission apparatus including circuitry configured to generate a media presentation description (MPD) that conforms to the moving picture expert group-dynamic adaptive streaming over HTTP (MPEG-DASH) standard, the MPD including information for performing at least one of selection or grouping of components according to a level of a component hierarchy associated with the components and controlling playback of content of at least one of the components; and transmit the generated MPD in a digital broadcast signal or via a communication network.

(12)

A transmission method of a transmission apparatus, the method including generating, by circuitry of the transmission apparatus, a media presentation description (MPD) that conforms to the moving picture expert group-dynamic adaptive streaming over HTTP (MPEG-DASH) standard, the MPD including information for performing at least one of selection or grouping of components according to a level of a component hierarchy associated with the components and controlling playback of content of at least one of the components; and transmitting, by the circuitry, the generated MPD in a digital broadcast signal or via a communication network.

(13)

The reception apparatus according to any one of (1) to (9), wherein the MPD includes a first element for designating a pair of AdaptationSet elements, in a range outside of the component hierarchy.

(14)

The reception apparatus according to (13), wherein the first element is a Subset element, and wherein a set of AdaptationSet elements is designated by a contains-attribute of the Subset element.

(15)

The reception apparatus according to (13) or (14), wherein the MPD includes a second element for defining a relationship between the AdaptationSet elements of the MPD, a relationship between the Representation elements, or a relationship between the SubRepresentation elements, and wherein a relationship between Representation element groups under the AdaptationSet element is designated by the second element.

(16)

The reception apparatus according to (15), wherein the second element is an EssentialProperty element, and wherein a relationship between the Representation element groups under the AdaptationSet element is designated by the schemeIdUri attribute of the EssentialProperty element.

(17)

The reception apparatus according to any one of (13) to (16), wherein the component hierarchy includes a first level, a second level, and a third level, wherein the third level is for adaptively selecting one of the components, wherein the second level is for grouping the component that is selected in the third level and components that are not a target of the third level into one group component, and wherein the first level is for selecting one component among the group component grouped in the second level, the component selected in the third level, and the components that are not targets of the second level and the third level.

(18)

The reception method according to (10), wherein the MPD includes a first element for designating a pair of AdaptationSet elements, in a range outside of the component hierarchy.

(19)

The transmission apparatus according to (11), wherein the circuitry is further configured to generate the MPD including a first element for designating a pair of AdaptationSet elements, in a range outside of the component hierarchy.

(20)

The transmission method according to (12), wherein the step of generating the MPD further includes generating the MPD including a first element for designating a pair of AdaptationSet elements, in a range outside of the component hierarchy.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Broadcast communication system
10 Channel streamer

20 MPD providing device
30 DASH segmenter and streamer
50 Client device
90 Network
101 Content management unit
102 Content accumulation unit
103 Communication unit
201 MPD generation unit
202 Communication unit
203 Transmission unit
301 Segment data generation unit
302 Segment metadata generation unit
303 Communication unit
304 Transmission unit
501 Control unit
502 Reception unit
503 Display
504 Speaker
505 Recording unit
506 Communication unit
551 MPD acquisition unit
552 Component selection unit
553 Segment data acquisition unit
554 Segment data playback unit
900 Computer
901 CPU

The invention claimed is:

1. A reception apparatus, comprising:
circuitry configured to
receive a digital broadcast signal; and
based on a media presentation description (MPD) that conforms to the moving picture expert group-dynamic adaptive streaming over HTTP (MPEG-DASH) standard and includes first information indicating that a plurality of AdaptationSet elements are associated and second information indicating that a plurality of AdaptationSet elements are grouped and belong to the same group to be selected, and is transmitted in the digital broadcast signal or via a communication network,
control playback of content,
wherein the MPD includes a first element for designating a pair of AdaptationSet elements, the first element is a Subset element, and a set of AdaptationSet elements is designated by a contains-attribute of the Subset element,
wherein the MPD includes a second element for defining a relationship between the AdaptationSet elements of the MPD, a relationship between Representation elements, or a relationship between SubRepresentation elements, and
wherein a relationship between Representation element groups under the AdaptationSet element is designated by the second element.

2. The reception apparatus according to claim 1, wherein the second element is an EssentialProperty element, and
wherein a relationship between the Representation element groups under the AdaptationSet element is designated by a schemeIdUri attribute of the EssentialProperty element.

3. A reception method of a reception apparatus, the method comprising:
receiving a digital broadcast signal; and
based on a media presentation description (MPD) that conforms to the moving picture expert group-dynamic adaptive streaming over HTTP (MPEG-DASH) standard and includes first information indicating that a plurality of AdaptationSet elements are associated and second information indicating that a plurality of AdaptationSet elements are grouped and belong to the same group to be selected, and is transmitted in the digital broadcast signal or via a communication network,
controlling, by the circuitry, playback of content,
wherein the MPD includes a first element for designating a pair of AdaptationSet elements, the first element is a Subset element, and a set of AdaptationSet elements is designated by a contains-attribute of the Subset element,
wherein the MPD includes a second element for defining a relationship between the AdaptationSet elements of the MPD, a relationship between Representation elements, or a relationship between SubRepresentation elements, and
wherein a relationship between Representation element groups under the AdaptationSet element is designated by the second element.

4. A transmission apparatus, comprising:
circuitry configured to
generate a media presentation description (MPD) that conforms to the moving picture expert group-dynamic adaptive streaming over HTTP (MPEG-DASH) standard, and includes first information indicating that a plurality of AdaptationSet elements are associated and second information indicating that a plurality of AdaptationSet elements are grouped and belong to the same group to be selected; and
transmit the generated MPD in a digital broadcast signal or via a communication network,
wherein the MPD includes a first element for designating a pair of AdaptationSet elements, the first element is a Subset element, and a set of AdaptationSet elements is designated by a contains-attribute of the Subset element,
wherein the MPD includes a second element for defining a relationship between the AdaptationSet elements of the MPD, a relationship between Representation elements, or a relationship between SubRepresentation elements, and
wherein a relationship between Representation element groups under the AdaptationSet element is designated by the second element.

5. The transmission apparatus according to claim 4, wherein one or a plurality of components constituting a multiplexed stream are enumerated for each of the plurality of AdaptationSet elements, the one or the plurality of components include one or a plurality of audio components.

6. The transmission apparatus according to claim 5, wherein the one or a plurality of components are listed in one or a plurality of Representation elements under the AdaptationSet elements.

7. The transmission apparatus according to claim 4, wherein the first information and the second information are specified as attributes of elements described in the Period elements of the MPD.

8. The transmission apparatus according to claim 7, wherein the attributes of the elements are described in the Period element are defined in on the same Subset element.

9. A transmission method of a transmission apparatus, the method comprising:
generating, by circuitry of the transmission apparatus, a media presentation description (MPD) that conforms to the moving picture expert group-dynamic adaptive streaming over HTTP (MPEG-DASH) standard and includes first information indicating that a plurality of AdaptationSet elements are associated and second information indicating that a plurality of AdaptationSet elements are grouped and belong to the same group to be selected; and transmitting, by the circuitry, the generated MPD in a digital broadcast signal or via a communication network, wherein the MPD includes a first element for designating a pair of AdaptationSet elements, the first element is a Subset element, and a set of AdaptationSet elements is designated by a contains-attribute of the Subset element, wherein the MPD includes a second element for defining a relationship between the AdaptationSet elements of the MPD, a relationship between Representation elements, or a relationship between SubRepresentation elements, and wherein a relationship between Representation element groups under the AdaptationSet element is designated by the second element.

* * * * *